(12) United States Patent
Richter et al.

(10) Patent No.: US 7,254,679 B2
(45) Date of Patent: Aug. 7, 2007

(54) COMPUTER SYSTEM FOR DATA PROCESSING AND METHOD FOR THE TRANSFER OF AN ARRAY SEGMENT OF AN AFFINE-INDEXED MULTI-DIMENSIONAL ARRAY REFERENCED IN A LOOP NEST FROM A FIRST MEMORY TO A SECOND MEMORY

(75) Inventors: Mathias Richter, Munich (DE); Mirko Sauermann, Neubiberg (DE)

(73) Assignee: Infineon Technologies AG (DE)

( * ) Notice: Subject to any disclaimer, the term of this patent is extended or adjusted under 35 U.S.C. 154(b) by 414 days.

(21) Appl. No.: 10/911,224

(22) Filed: Aug. 4, 2004

(65) Prior Publication Data

US 2006/0031652 A1    Feb. 9, 2006

(51) Int. Cl.
G06F 12/00    (2006.01)
(52) U.S. Cl. ......................................... 711/147; 710/33
(58) Field of Classification Search ................ 711/147; 710/33
See application file for complete search history.

(56) References Cited

OTHER PUBLICATIONS

Amarasinghe, Saman Prabhath, "Parallelizing Compiler Techniques Based on Linear Inequalities", Disseration, University of Stanford, 1997.
Ancourt, Corinne, et al., "Scannin Polyhedra with DO Loops", 3rd ACM SIGPLAN Symposium on Principles and Practice of Parallel Programming, 1991, pp. 39-50.
O'Boyle, M.F.P., et al., "Non-Singular Data Transformations: Definition, Validity and Applications", Int. J. of Parallel Programming, 1999, vol. 27, No. 3, pp. 131-159.
Clauss, Philippe, et al., "Automatic Memory Layout Transformations to Optimize Spatial Locality in Parameterized Loop Nests", ACM SIGARCH Computer Architecture News, Mar. 2000, vol. 28, No. 1.
Numerical C Extensions Group of X3J11, Data Parallel C Extensions, Technical Report, Version 1.6, 1994.
Mongenet, Catherine, "Affine dependence classification for communications minimization", International Journal of Parallel Programming, 1997, vol. 25, No. 6.
Schrijver, Alexander, "Theory of lattices and linear diophantine equations", Theory of Linear and Integer Programming, Wiley, 2000.
Sloik, Adrian, "Volume Driven Selection of Loop and Data Transformations for Cache-Coherent Parallel Processors", Dissertation, University of Paderborn, 1999.
Wolf, Michael E., et al., "A Data Locality Optimizing Algorithm", Proceedings of the ACM SIGPLAN '91 Conference on Programming Language Design and Implementation, 1991, pp. 30-44.
Strout, Michelle Mills, et al., "Schedule-Independent Storage Mapping for Loops", Architectural Support for Programming Languages and Operating Systems, 1998, pp. 24-33.

(Continued)

*Primary Examiner*—Jack A. Lane
(74) *Attorney, Agent, or Firm*—Dickstein, Shapiro, LLP.

(57) ABSTRACT

Computer system for electronic data processing having programmable data transfer units used for transferring data from a first memory in which data is stored in a form of a multi-dimensional array to a second memory in such a way, that spatial or temporal locality for the transfer is established.

13 Claims, 5 Drawing Sheets

OTHER PUBLICATIONS

Thies, William, et al., "A Unified Framework for Schedule and Storage Optimization", Proceedings of the ACM SIGPLAN 2001 Conference on Programming Language Design and Implementation, 2001, pp. 232-242.

Quillere, Fabien, et al., "Optimizing memory usage in the polyhedral model", ACM Transactions on Programming Languages and Systems, 2000, vol. 22, No. 5, pp. 773-815.

Lim, Amy W., et al., "Blocking and Array Contraction Across Arbitrarily Nested Loops Using Affine Partitioning", Proceedings of the 8th ACM SIGPLAN symposium on Principles and Practices of Parallel Programming, 2001, pp. 103-112.

Wolf, Michael Edward; "Improving Locality and Parallelism in Nested Loops"; A Dissertation Submitted to the Department of Computer Science and the Committee on Graduate Studies of Stanford University in Partial Fulfillment of the Requirements For the Degree of Doctor of Philosophy; 1992.

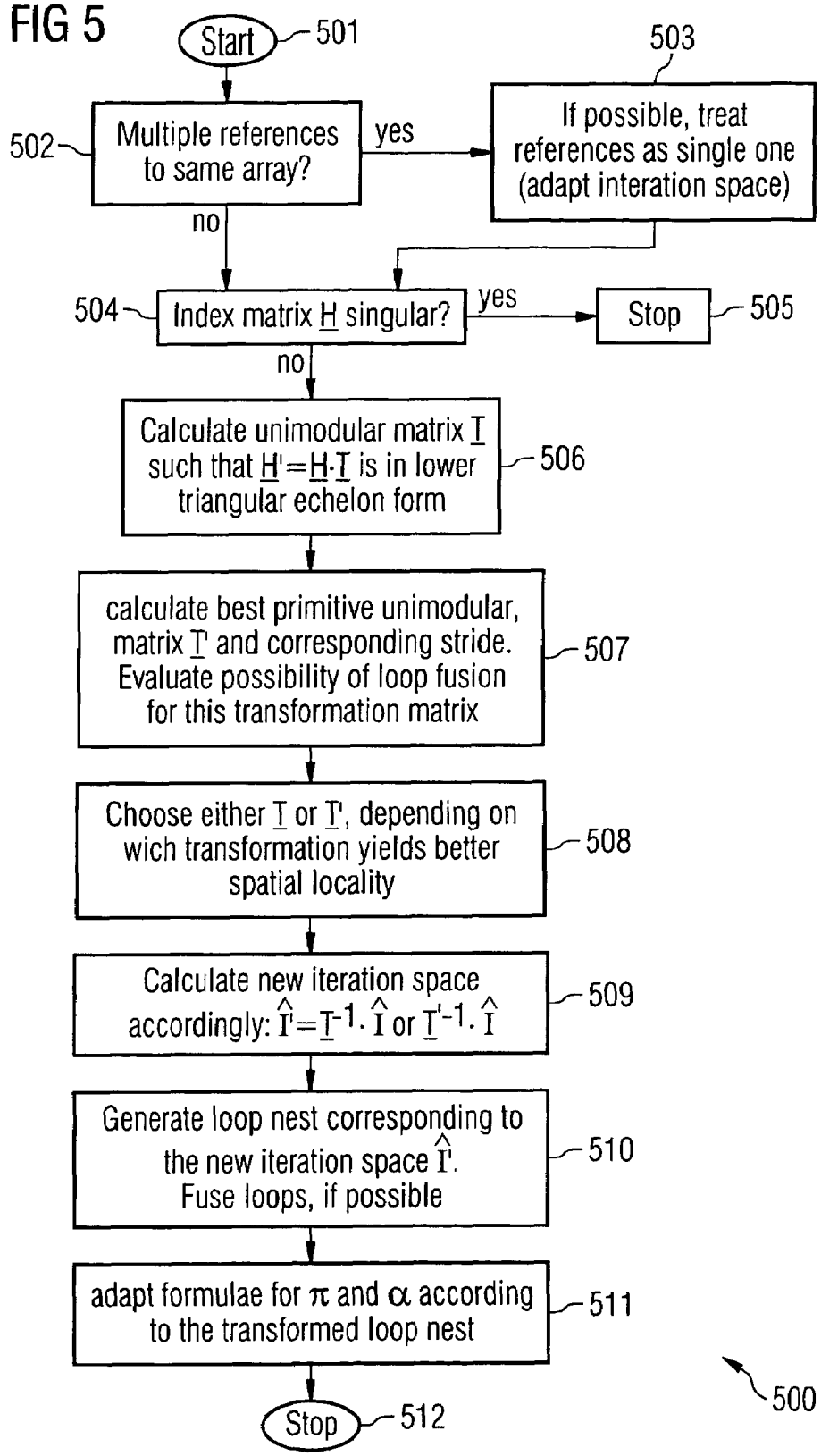

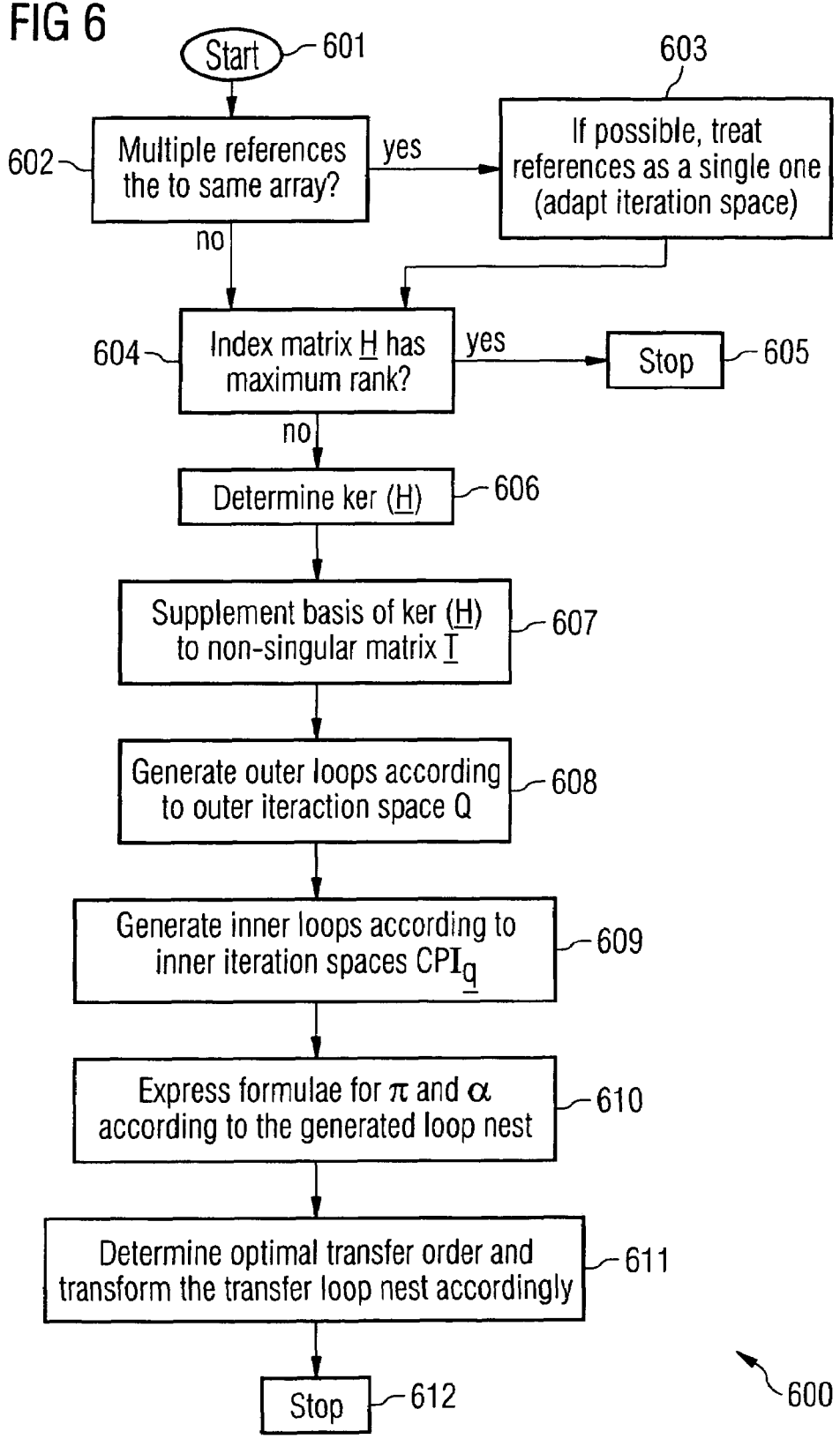

COMPUTER SYSTEM FOR DATA PROCESSING AND METHOD FOR THE TRANSFER OF AN ARRAY SEGMENT OF AN AFFINE-INDEXED MULTI-DIMENSIONAL ARRAY REFERENCED IN A LOOP NEST FROM A FIRST MEMORY TO A SECOND MEMORY

FIELD OF THE INVENTION

The invention relates to a computer system for data processing and a method for the transfer of an array segment of an affine-indexed multi-dimensional array referenced in a loop nest from a first memory to a second memory.

BACKGROUND OF THE INVENTION

Computer programs concerning scientific or engineering applications typically comprise a lot of loop controlled operations on array data.

Since the performance of single computers still often does not suffice for such applications and since there is a demand for high performance of the applications, a lot of research is done in the area of parallel computing. In parallel computing, parts of the applications which involve a lot of computations are distributed among a plurality of processing elements which communicate with each other, if possible.

One example of such a parallel computer architecture is a Single Instruction Multiple Data (SIMD) architecture, which comprises a plurality of parallel processing elements which get their instructions from a single instruction memory.

For a computer system comprising a parallel architecture compilers are necessary, which can transform computer programs into a form which can be interpreted by the computer system. There exist variants of programming languages like the derivative Data Parallel C Extension (DPCE) of the well-known programming language C (see Numerical C Extensions Group of X3J11, Data Parallel C Extensions, Technical Report, Version 1.6, 1994), which allow the programmer to express the parallelism of the application via the formulation in the computer language. In contrast to a formulation using systems of affine recurrence equations (see e.g. Catherine Mongenet, Affine Dependence Classification for Communications Minimization, International Journal of Parallel Programming, vol. 25, number 6, 1997), which are single assignment and which in general operate on parallel variables of the same dimensionality as the iteration space, DPCE contains both parallel statements and sequential loops and thus forces (and enables) the programmer to explicitly express the relation between parallelism and memory usage he wishes to be established.

In parallel computing concerning scientific and engineering applications, there are especially considered loop nests operating on multi-dimensional arrays with affine index functions. These can be analysed statically by a compiler and since they are predominant in scientific and engineering applications there is a lot of interest in developing methods for compilation of programs including loop nests operating on multi-dimensional arrays such that high performance of the compiled programs is achieved.

The well known obstacles to achieving high performance for the named applications on parallel architectures are communication overhead and/or the I/O bottleneck.

In a SIMD architecture, the data to be processed are typically stored in a shared memory and have to be transferred to local distributed memories, where it is processed by the parallel processing elements.

In a SIMD architecture, by way of example, in which there exists a general purpose processor used for non-parallel data processing and control flow management, a shared memory and an array of parallel processing elements which are each equipped with a local memory and a number of functional units the data which have to be processed are distributed to the local memories according to the parts of the data which are processed by the different parallel processing elements.

This data transfer between the shared memory and the local memories typically has big bandwidth requirements, produces communication overhead and typically leads to low performance for the application.

For achieving high performance for the applications, a compiler must map the parallelism of the program, for instance parallelism adapted to a SIMD architecture, which is expressed in the program in the according programming language, like DPCE, to the computer system in a way to minimize communication and data transfer overheads.

Typically, data transfers occur in blocks of contiguous bytes. This means that if some data in the shared memory are needed in a local memory, for example a data word which corresponds to some floating point number, that a whole block of data which comprise this data word are transferred to the local memory. The size of this block typically depends on the size of the bus used for the data transfer.

Transferring more data than needed at the moment charges the limited local memory. But it may happen that some of these incidentally transferred data are in fact used later in time. This phenomenon is called spatial reuse, i.e., reuse of data located nearby in memory.

It would increase the performance of the transfer if the data transferred in one block to a local memory were still resident in the local memory when they are later used by the respective processing element and would not have to be transferred again.

Because of the limited size of local memories this becomes only possible when spatial reuse occurs early enough in time since otherwise the data which are used later is deleted from the local memory.

If spatial reuse occurs early enough in time such that data which have been transferred in a data transfer along with data which had to be transferred because they have been accessed have not to be transferred again, it is said in the following that spatial Locality is established for the data transfer.

Another type of reuse which can be exploited is so-called temporal reuse.

This means that data which are used at one time in a program is used later in time, i.e. at a later stage of processing.

In a SIMD architecture as described above, for example, where there is executed a program including a loop nest, there is temporal reuse if the same data are accessed a multiple number of times.

As above in the case of spatial reuse, performance can be increased if data which are accessed a multiple number of times have not to be transferred to a local memory each time they are accessed.

If temporal reuse occurs early enough in time, such that data which had to be transferred in a data transfer because they have been accessed have not to be transferred again when they are accessed again, it is said in the following that temporal locality for the data transfer is established.

Because of the restricted size of local memories, temporal reuse must happen early enough before the data which are reused and have been transferred to a local memory have to be replaced in the local memory. This is a so called scheduling problem. It means the compiler has to (re)organize the order of computations by applying loop transformations such that temporal locality of data is achieved.

In the following, the expression locality means spatial locality as well as temporal locality.

Some techniques are commonly used to achieve locality.

Firstly, loop transformations are used to change the order of computation in order to augment both temporal and spatial locality at the same time Michael E. Wolf, Monica S. Lam, A Data Locality Optimizing Algorithm, Proceedings of the ACM SIGPLAN '91 Conference on Programming Language Design and Implementtion, 30-44, 1991.

While there is no alternative to loop transformations, especially to tiling (see Wolf et al. (cited above)), for achieving temporal locality, their applicability is restricted by loop dependencies.

Therefore, additional data transformations are suggested in order to change the layout of data in memory. Arrays shall be re-stored in memory in the order in which they are used (see Philippe Claus, Benoit Meister, Automatic Memory Layout Transformations to Optimize Spatial Locality in Parameterized Loop Nests, ACM SIGARCH Computer Architecture News, Vol. 28, No. 1, March 2000, and Adrian Slowik, Volume Driven Selection of Loop and Data Transformations for Cache-Coherent Parallel Processors, Dissertation, University of Paderborn, 1999).

However, such data transformations are global in nature, i.e. they must be propagated to all references of an array in the program, eventually leading to a bad layout for a different reference. This effect must be counterbalanced by a careful combination of loop and data transformations, where loop transformations can be used to locally repair effects of data transformations M. F. P. O'Boyle, P. M. W. Knijnenburg, Nonsingular Data Transformations: Definition, Validity and Applications, Int. J. of Parallel Programming, 27(3), 131-159, 1999.

This additionally narrows down the degrees of freedom in the choice of loop transformations and may not be feasible together with conflicting optimisation goals. The globally best may be a compromise layout only, which is not optimal for an individual loop nest.

Also, achieving a new memory layout requires copying operations and thus costs run time.

Finally, most programming languages allow arrays of rectangular shape only. Since a transformed array has polyhedral shape at first, a bounding box must be constructed which may lead to much larger arrays than the original arrays.

A different means of reducing negative effect of input and output on performance is the collapsing of multidimensional arrays (see M. M. Strout et al. (cited above), W. Thies et al. (cited above), and F. Quilleré et al. (cited above)).

This is a technique used in the context of automatic parallelization, where arrays are expanded to bring programs into single assignment form in order to get rid of storage related dependences.

Later, one wishes to collapse into the same memory locations array dimensions which were just used for temporary storage.

This idea was not yet, but principally is applicable to optimisation of locality: expanded arrays correspond to iteration space tiles and one can "collapse" a tile such that all of its indices refer to different array elements.

The collapsed tile defines local memory addresses and also defines the array elements to be transferred. Thus multiply indexed data will be transferred only a single time.

The most general of these techniques is that of F. Quilleré et al. (cited above) which considers collapsing in multiple directions simultaneously, whereas M. M. Strout et al. (cited above) and W. Thies (cited above) only consider collapsing into a single direction and thus only by one dimension.

A different approach is that suggested in A. W. Lim, S.-W. Liao, M. S. Lam, Blocking and Array Contraction across arbitrarily nested Loops using Affine Partitioning, Proceedings of the eighth ACM SIGPLAN symposium on Principles and Practices of Parallel Programming, 103-112, 2001, however they are restricted in the choice of directions into which an array can be collapsed.

However, the named techniques apply to the problem of reducing temporary memory usage arising in the model of computation defined by affine recurrence equation, which is different from the problem of establishing locality for data transfer.

The purpose of optimising locality is not to minimize memory usage, but to minimize the negative effect of input and output on performance, i.e. to minimize the amount of data transfers between shared and local memory, since this costs run time.

SUMMARY OF THE INVENTION

An object of the invention is to establish locality for the transfer of affine-indexed segments of multidimensional arrays, which are stored in a first memory and are transferred to a second memory and are referenced in a loop nest.

This object is achieved by an apparatus for data processing and a method for the transfer of affine-indexed array segments from a first memory to a second memory, which are referenced in a loop nest with the features.

According to the invention, there is provided a computer system for electronic data processing comprising a first memory in which data are stored in the form of a multi-dimensional array; a second memory connected to the first memory; a processing unit for operating on the second memory; at least one independently programmable data transfer unit for controlling the data transfer between the first memory and the second memory, wherein the at least one data transfer unit controls the data transfer according to a data transfer strategy such that, when an affine-indexed array segment of the multi-dimensional array is transferred and when this array segment is referenced in a loop nest, locality for the transfer is established.

Further, according to the invention, there is provided a method for the transfer of an affine-indexed array segment of a multi-dimensional array referenced in a loop nest from a first memory to a second memory, wherein the data transfer is controlled by independently programmable data transfer units; a transfer loop nest is executed on the independently programmable data transfer unit; the transfer loop nest is a copy of the original loop nest in which the array segment is referenced, with the loop body replaced by just a data access function for the multi-dimensional array under consideration and to which copy a loop transformation has been applied; and the applied loop transformation is such that locality for the data transfer is established.

According to the invention, the apparatus for data processing comprises an independently programmable data transfer unit that is, it can be programmed independently of the processing element. Preferably, the first memory is a global memory which holds data to be processed by the processing element, which itself operates on the second memory which is its local memory. In a preferred embodiment, there are a plurality of processing elements, each with its own local memory. In this embodiment, it becomes especially important to organize data transfer in an efficient way since the global memory typically receives a lot of requests from the plurality of local memories, so it can not afford to waste bandwidth or to create a lot of communication overhead.

Establishing locality for a data transfer means that the data transfer is organized in such a way, that the amount of data which are transferred a multiple number of times is as low as possible.

Illustratively speaking, this is achieved by exploiting spatial reuse and/or temporal reuse.

The independently programmable data transfer unit allows the transfer of data from the first memory to the second memory to run in parallel to the processing of the data by the processing element. Further, the transfer order of data can be different from the order in which the data are processed by the processing element. In particular an order of the data transfer can be chosen without the need to consider data dependencies which might restrict the order of processing the data. Likewise, a transfer order can be chosen without considering conflicting optimality criteria, for example, the order of the processing of the data can be different from the transfer order and could be chosen such that the processing speed is optimal. Thus, this gives a high degree of freedom for the change of the data transfer order, thereby providing the opportunity to organize the data transfer in such a way that locality is significantly established.

Additionally, locality can be established without changing the global data layout of an array. Thus, no run time overhead by data copying is produced and there is no danger of blowing up usage of the first memory by array reshaping.

The computer system according to the invention has some distinct advantages over a computer system comprising a cache memory. A cache memory typically comprises cache memory lines which can cache memory data of a certain area of the memory from where the data are loaded into the cache memory. For instance, the first eight cache lines can hold data which are stored in the first 256 lines of the first memory, the second eight cache lines can hold data which are stored in the second 256 lines of the first memory and so on.

Even if the cache memory is more flexible, or more cache lines are provided for the different areas of the first memory, often data have to be erased from the cache memory although the data are used again while other lines of the cache memory are unused since they correspond to areas of the first memory which hold data that are not required at the moment. The programmable data transfer unit, however, provides far more flexibility than a cache memory. It can use the second memory totally freely, for instance, it can store all the data from a certain area in the second memory and can delete it, when it is no longer used and can after that store data from a different area in the second memory. Further, even if a cache memory comprises a concept which works very well for one section of the program, it will typically be not flexible enough to also work well for other sections of the program. The programmable data transfer unit, however, can be programmed and therefore it can be programmed in such a way that the data transfer strategy is always optimal for the current section of the program. Finally, in the case of statically analysable loop nests, as they are important in the field of scientific and technical computing and as we are considering them here, programmable data transfer units make the timing behaviour of memory accesses predictable. This is highly desired in real time programming.

According to a method of the invention, locality for the transfer of data from the first memory to the second memory is established.

In a preferred embodiment, even optimal spatial locality can be achieved. Thus, the necessary bandwidth for the data transfer and the communication overhead of the communication between the memories is significantly reduced. Since the transfer of data and the communication overhead often lead to a bound for the performance of the whole application, the well-known I/O bottleneck, the performance of the whole application can be improved by the method according to the invention.

Further, the method for establishing locality according to the invention can be implemented in a computer program in particular, it can be incorporated in an optimisation stage of a compiler for the considered architecture. Thus, the programmer himself does not need to bother about locality when writing the program.

Further, the method can be implemented in form of a program element which can be stored on a computer readable medium.

In a preferred embodiment, a plurality of tiles of a multi-dimensional array are processed. Since the processing element and the transfer unit operate independently from each other, while one tile is processed, the transfer for a previous or future tile can be on the way.

According to the invention, the independently programmable data transfer unit is programmed in such a way that it controls the data transfer according to a data transfer strategy such that locality for the transfer is established.

A basic idea of the invention may be seen in that a copy of the original loop nest, in which the affine-indexed array segments are referenced, with the loop body replaced by just a data access function for the array under consideration and to which copy a loop transformation has been applied is executed on the independently programmable data transfer unit. The applied loop transformation is chosen in such a way, that locality is achieved for the data transfer.

It is preferred that the provided computer system comprises a parallel computer architecture and comprises a plurality of parallel processing elements, the first memory is a shared memory, the second memory is a local memory and the processing unit is one of the plurality of parallel processing elements.

Preferably, the parallel computer architecture is a SIMD architecture.

It is further preferred that the data transfer occurs in blocks of bytes which are contiguous in the first memory.

Preferably, the provided computer system comprises a first independently programmable data transfer unit controlling the data transfer from the first memory to the second memory and a second independently programmable data transfer unit controlling the data transfer from the second memory to the first memory.

It is further preferred that in the provided method multiple array references are summarized into single transfer objects, whenever possible, such that multiple transfers of the same data elements are avoided.

Preferably, the loop transformation applied according to the method according to the invention is such that optimized stride is achieved in the innermost loop of the transfer loop nest.

It is further preferred that in the provided method a unimodular matrix is computed such that the product of the unimodular matrix and the index matrix is in lower triangular echelon form and the applied transformation corresponds to a multiplication of the original iteration space with the inverse of the unimodular matrix.

Preferably, a unimodular matrix is computed such that its last column represents the iteration space vector achieving minimal stride, which is computed as the solution of a linear integer program, and the applied transformation corresponds to a multiplication of the original iteration space with the inverse of the unimodular matrix.

Preferably, one matrix of the unimodular matrix and a competing second unimodular matrix that is a product of loop permutations and loop reversals and that allows fusion of loops from the transformed iteration space is selected and wherein the selection depends on which of the two matrices leads to optimized spatial locality for the data transfer in terms of an optimal ratio between transferred and used data when the matrix is used as a transformation matrix for the loop transformation.

It is further preferred that in the provided method, when the index matrix is singular, a projected iteration space is calculated such that temporal locality for the data transfer is established.

BRIEF DESCRIPTION OF THE DRAWINGS

Illustrative embodiments of the invention are explained below with reference to the drawings, in which FIG. 1 gives a schematic view of an embodiment of the computer system according to the invention;

FIG. 5 shows a flow diagram illustrating an embodiment of the method according to the invention;

FIG. 6 shows a flow diagram illustrating another embodiment of the method according to the invention.

DETAILED DESCRIPTION OF THE PREFERRED MODE OF THE INVENTION

Figure 1:
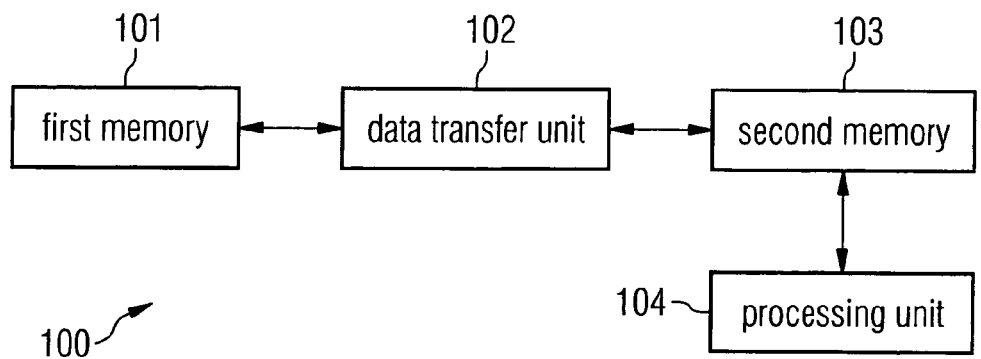

FIG. 1 gives a schematic view of the computer system 100 according to one embodiment of the invention.

A first memory 101 is connected via a data transfer unit 102 to a second memory 103. A processing unit 104 operates on the second memory 103.

In this embodiment, the first memory 101 contains data which have to be processed by the processing element 104. Since the processing unit can only process data which are stored in the second memory 103, the data to be processed have to be transferred to the second memory 103. According to the invention, the data transfer is controlled by the data transfer unit 102, which can be programmed independently from the processing unit 104.

An engineering application computer program, by way of example, runs on the computer system 100. This engineering application might for example be a simulation computer program for simulating the air flow around a car. Let some of the data to be processed by the processing unit 104 be stored in the first memory 101 in the form of a multi-dimensional array. Further, let the application computer program comprise a loop nest which comprises references to this data. Preferably, a transfer loop nest corresponding to the loop nest is generated and is executed on the data transfer unit such that locality for the transfer of the required data is established.

Figure 2:
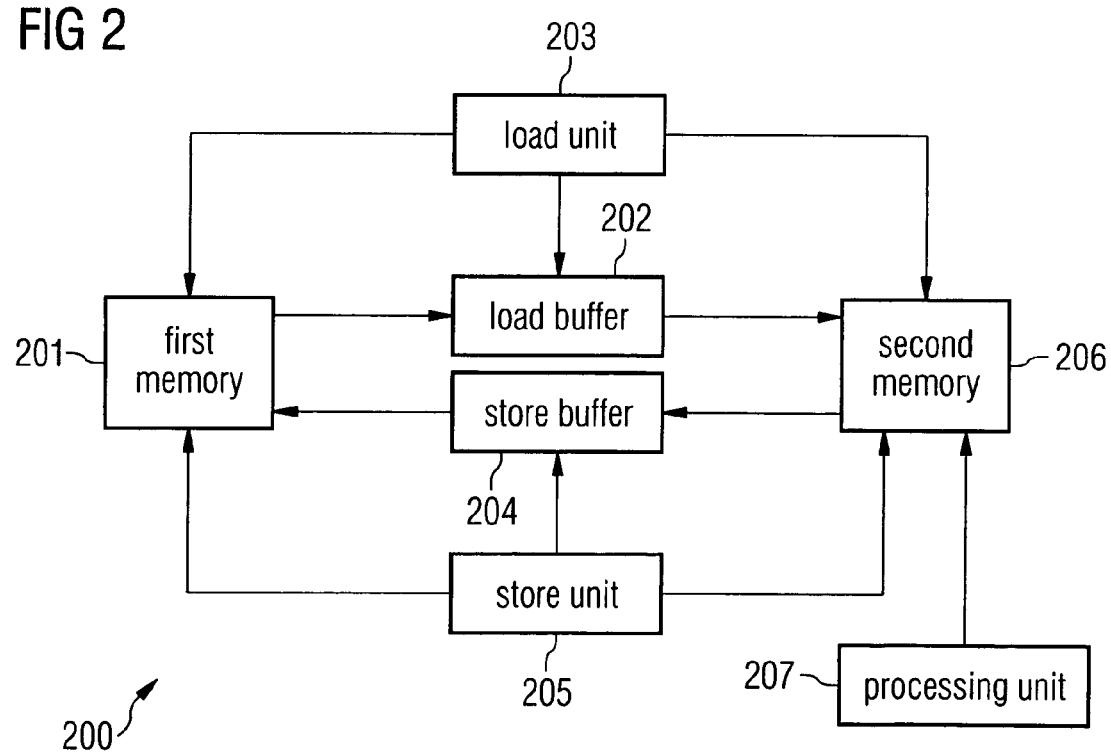
FIG. 2 gives a schematic view of another embodiment of the computer system according to the invention.

FIG. 2 gives a schematic view of the computer system 200 according to another embodiment of the invention.

The embodiment of the computer system of the invention shown in FIG. 2 is similar to the one shown in FIG. 1. In this embodiment, however, load operations and store operations are separated. A load operation is an operation which transfers data from the first memory 201 to the second memory 206. A store operation is an operation which transfers data from the second memory 206 to the first memory 201. For this, there exists a load unit 203 which controls the load data transfers and a store unit 205 which controls the store data transfers. Further, the load and store transfers are each organized in two stages. In the case of a load transfer, in the first stage, the data from the first memory 201 is transferred into a load buffer 202. In the second stage, the contents of the load buffer 202 are transferred to the second memory 206. In this preferred embodiment, these two stages are controlled by the load unit 203. In one embodiment, the load buffer 202 can be filled using unit strided accesses only.

Store data transfers work equivalently. The data are first transferred from the second memory 206 to the store buffer 204 and then from the store buffer 204 to the first memory 201. The store data transfer is controlled by the store unit 205.

As in the embodiment illustrated in FIG. 1, some application computer program, for example a simulation computer program, runs on the computer system 200. The application computer program comprises calculations which are performed by a processing unit 207 which operates on the second memory 206. For example, the processing unit 207 multiplies two matrices which are stored in the second memory 206 and stores the result in the second memory 206.

In the following, a simple example for the generation of a transfer loop nest for this embodiment is given.

In this example the data to be processed is a two-dimensional array B, i.e. a matrix B, with ten rows and ten columns. The matrix B is stored in the first memory 201. The application computer program is written in the C programming language and comprises a simple loop nest which produces a transposed matrix A of the matrix B, i.e.:

```
for (i=0; i<10; i++)
    for (j=0; j<10; j++)
        A[i][j]=B[j][i];
```

This loop nest iterates, in the outer loop, over the index variable i from the value 0 to the value 9 in steps of 1. The inner loop, which is executed in every iteration of the outer loop, iterates over the index variable j from the value 0 to the value 9 in steps of 1. In every iteration of the inner loop, the component in the ith row and the jth column of the matrix A is set as the component in the jth row and the ith column of the matrix B. Thus, the loop nest sets the matrix A to be the transposed matrix of the matrix B.

For this loop nest, two transfer loop nests, one for the references to the array A to be executed on the store unit 205 and one for the references to the array B to be executed on the load unit 203 are generated. For the latter, according to this embodiment of the invention, a copy of the original loop nest is generated wherein the loop body is replaced by just a data access function:

```
for (i=0; i<10; i++)
    for (j=0; j<10; j++)
        transfer(B[j][i]);
```

This loop nest iterates, in the outer loop, over the index variable i from the value 0 to the value 9 in steps of 1. The inner loop, which is executed in every iteration of the outer loop, iterates over the index variable j from the value 0 to the value 9 in steps of 1. In every iteration of the inner loop, the component in the jth row and the ith column of the array B is to be transferred from the first memory 201 to the second memory 206.

Since in this embodiment, C programming language conventions are used, i.e., arrays are stored row by row, spatial locality can be established if the array B is not transferred column by column as in the above loop nest, but row by row, as in the transformed loop nest for (j=0; j<10; j++)
   for (i=0; i<10; i++)
      transfer(B[j][i]);

This loop nest iterates, in the outer loop, over the index variable j from the value 0 to the value 9 in steps of 1. The inner loop, which is executed in every iteration of the outer loop, iterates over the index variable i from the value 0 to the value 9 in steps of 1. In every iteration of the inner loop, the component in the jth row and the ith column of the array B is to be transferred from the first memory 201 to the second memory 206.

This loop nest can be used as the transfer loop nest, thereby establishing spatial locality for the transfer.

Finally, the transfers themselves are configured in such a way that data will be stored in the second memory 206 in the order in which they are processed. Thus, complicated local memory addressing for the processing unit 207 is avoided, which would counterbalance the savings from accelerating the data transfer.

Details about the loop transformations which are preferably applied and the preferred configuration of the data transfer are given below.

Figure 3:
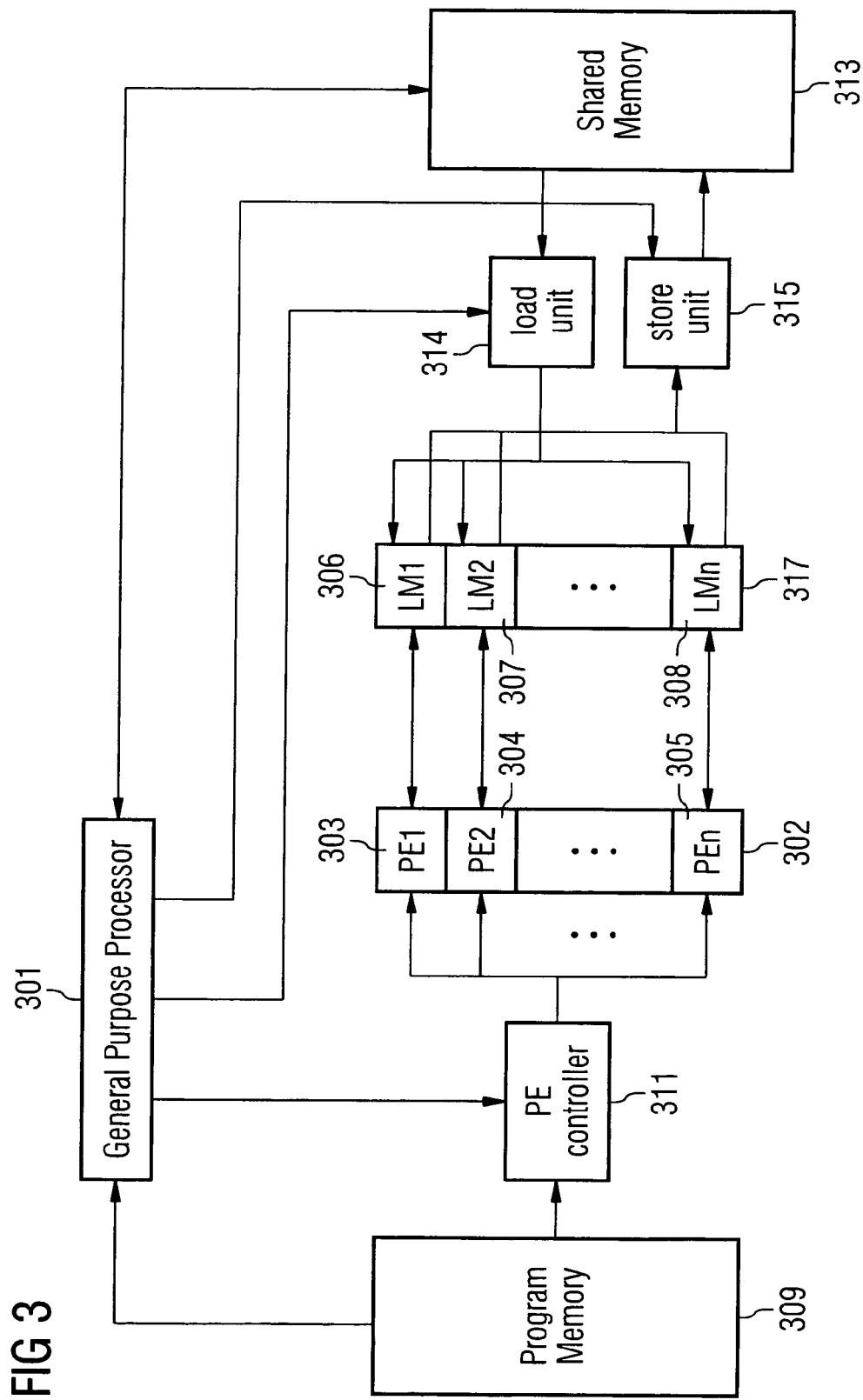
FIG. 3 shows an embodiment of the invention comprising a SIMD architecture.

FIG. 3 shows another embodiment of the invention, which is more complex than the ones shown in FIG. 1 and 2, namely an embodiment using a SIMD architecture. There are two processing units: a general purpose processor 301 (GP) and a one-dimensional array of parallel processing elements 302 comprising n parallel processing elements, the first parallel processing element 303 of which, the second parallel processing element 304 and the nth parallel processing element 305 are shown. Here, n denotes a positive integer number.

The general purpose processor is adapted to perform non-parallel data processing and control flow management.

Each parallel processing element 303, 304, 305 of the array of parallel processing elements 302 is equipped with a register file (not shown) and a number of functional units (arithmetic-logic, load/store transfer between local memory and register file, nearest neighbour PE communication; not shown). Further, each parallel processing element of the array of parallel processing elements operates on a local memory. Since for each parallel processing element there exists a local memory, there is an array of local memories 317 comprising n local memories. A first local memory 306 corresponds to the first parallel processing element 303, a second local memory 307 corresponds to the second parallel processing element 304 and a nth local memory 308 corresponds to the nth parallel processing element 305.

A program memory 309 contains the program instructions according to the application that is implemented on this embodiment of the computer system.

Since all parallel processing elements 303, 304, 305 of the array of parallel processing elements 302 are operated in SIMD manner, a single parallel processing element controller 311 is provided, which fetches instructions for the array of parallel processing elements from the program memory 309.

Instructions to be executed on the array of parallel processing elements 302 are fetched in blocks not containing control flow information (so called basic blocks). The general purpose controller 302 remains responsible for control flow and provides the parallel processing element controller 302 with the address of every block of instructions to execute. These addresses are preferable communicated via a First-In-First-Out device (FIFO; not shown).

A shared memory 313 contains the data to be processed. Data transfers between the shared memory 313 and the local memories 317, the first local memory 306, the second local memory 308, and the nth local memory 308 of which are shown, are according to the invention, accomplished by configurable data transfer units (DTU).

Since data transfer in both directions is decoupled to provide means for parallelization, there are two different kinds of independently programmable data transfer units in this embodiment: a load unit 314 is responsible for transferring data from the shared memory 313 to the local memories 317, and a store unit 315 is responsible for transferring data from the local memories 317 to the shared memory 313. The configuration parameters for the load unit and the store unit 315 are preferably communicated from the general purpose controller 310 via a First-In-First-Out device (FIFO; not shown).

Each data transfer unit comprises a controller (not shown) operating in an independent manner from the global purpose processor 301 in the same way as the parallel processing elements 303, 304, 305 of the parallel processing element array 305 operate independently form the global purpose processor. So, data transfers between shared memory 313 and the local memories must be explicitly programmed and can run in parallel to data processing.

The local memories are not transparent for the parallel processing elements. Rather, data management and addressing in local memories must be organized by the compiler.

By way of example, a scientific application computer program runs on the computer system 300 shown in FIG. 3. For instance, some simulation programs involving partial differential equations run on the computer system according to the embodiment. Since there exist solution methods for partial differential equations which can easily be parallelized, such a program is a typical application for this embodiment.

According to this embodiment of the invention, all multi-dimensional arrays which are used by the program are kept in the shared memory 313.

It is assumed that a tiling transformation (Michael E. Wolf (cited above)) is applied to the loop nest under consideration.

Tiling transformations are standard in compiler construction. A tiling transformation partitions the array under consideration into polyhedral segments. Now only when referenced in a loop nest, such a segment is transferred into the local memories. This allows the compiler to find an optimal data distribution per reference, thus reducing to to zero the communication overhead between different array references. Depending on the size of local memories and on how much reuse is inherent in an array reference, the time for data transfers between shared and local memories may be smaller than the processing time on an array, and may even become completely negligible.

For example, the first parallel processing element 303 has the task to add two segments of a matrix stored in the shared memory 313. The according program instructions are fetched from the program memory 309 and the two required array segments have to be transferred from the shared memory 313 to the first local memory 306. The independently programmable load unit 314 makes it possible to treat separately the task of transferring data between the shared memory 313 and the first local memory 306 and the task of processing the data by the parallel processing element. In particular, data can be transferred in a different order than that in which it is processed.

When the same data element is reused in time (temporal reuse), there is potential to reduce the number of data transfers. But by the restricted size of local memories, reuse should happen early enough before the datum has to be replaced in local memory. This is called the scheduling problem. It means that a compiler compiling a program for the computer system according to this embodiment preferably tries to organize the order of computations by applying loop transformations such that temporal locality of data is achieved.

Communication within a single array reference arises whenever data reuse occurs across different parallel processing elements. Preferably, the compiler finds a mapping of iteration indices onto the parallel processing elements (this mapping is also called allocation function) which reduces as much as possible the necessary communication.

Scheduling and allocation define the so called time-space-mapping. For the one-dimension array of parallel processing elements 302, a time-space-mapping is expressed by a linear loop transformation which results in an innermost parallel loop and outer loops to be executed sequentially. In one embodiment, the parallelism of the innermost loop is mapped to the physical processing units by block-cyclic distribution of its iteration indices.

According to one embodiment of the method of the invention a transfer order is chosen such that minimal stride within the innermost loop of the transfer loop is achieved. Minimal stride means that two data elements of an array which are referenced in two successive iterations of the innermost loop of the transfer loop nest have minimal distance in the array as it is stored in memory, that is, depending on the program language conventions, minimal distance for instance in a column by column sense or a row by row sense. An example for this is given below. By achieving minimal stride within the innermost loop, good spatial locality can be established.

A simple example for such a transfer order is explained in the following.

Figure 4A:
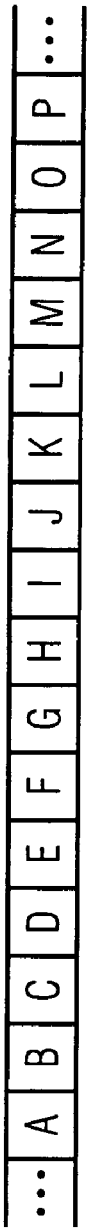
FIGS. 4(*a*), 4(*b*), and 4(*c*) show a simple example for a transfer order according to an embodiment of the method according to the invention.
Figure 4B:
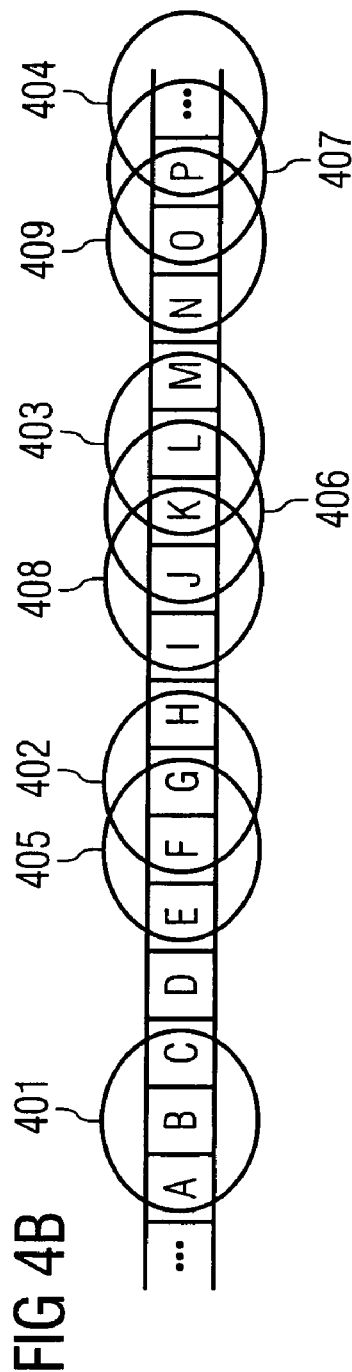
Figure 4C:
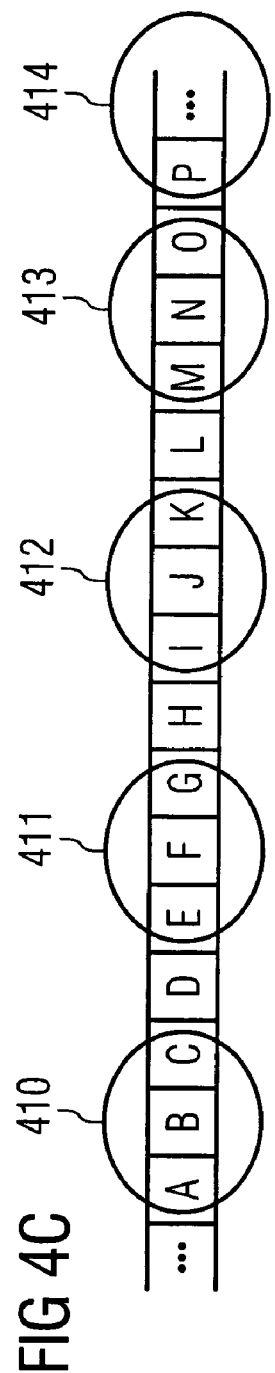

FIG. 4(a), FIG. 4(b) and FIG. 4(c) show a simple example for a transfer order according to an embodiment of the method according to the invention.

For example, the two dimensional array A[4][4], the data elements of which shall be A, B, C, D, E, F, G, H, I, J, K, L, M, N, O, P in a row-wise ordering, is stored in the shared memory 313 of the embodiment illustrated in FIG. 3, as shown in FIGS. 4(a), 4(b), and 4(c). FIG. 4(a) shows the ordering of data elements in shared memory, which is always to be assumed one dimensional. Now, let a program be executed which references in a loop the data words A, F, K, P, E, J, O, I, N, M, in that order. The corresponding loop nest can be written in a pseudo programming language as for (i=0; i<4; i++)
      for (j=0; j<4−i; j++)
        A[i+j][j]

This loop nest iterates, in the outer loop, over the index variable i from the value 0 to the value 3 in steps of 1. The inner loop, which is executed in every iteration of the outer loop, iterates over the index variable j from the value 0 to the value 4−i−1. In every iteration of the inner loop, the component in the i+jth row and the jth column of the array A is transferred.

In case the transfer order is not different from the order in which the data words are referenced, the data are transferred in the order shown in FIG. 4(b). At first, a first transfer block 401 comprising the data words A, B, and C is transferred. Then, since the data word F is needed and has not been transferred with the transfer block 401, a second transfer block comprising the data words F, G, and H is transferred. This goes on until transfer block 409 comprising data words N, O, and P is transferred. Only the data word M, which is referenced in the last iteration of the loop nest, has already been transferred into local memories.

Totally, nine transfer blocks have to be transferred.

According to a preferred embodiment of the invention, the transfer order is changed such that minimal stride within the innermost loop is achieved. Minimal stride means that the distance between two data words which are referenced in the transfer loop nest directly after another is minimal. The distance in memory between two referenced data words is simply the (positive) difference of their addresses.

If the data words are transferred in the order A, F, K, P, E, J, O, I, N, M, the stride is not minimal, since the distance between subsequent accesses in the innermost loop is 5.

Instead a loop transformation to the transfer loop nest can be applied and it can be transformed to the form for (i=0; i<4; i++)
      for (j=0; j<i; j++)
        A[i][j]

This loop nest iterates, in the outer loop, over the index variable i from the value 0 to the value 3 in steps of 1. The inner loop, which is executed in every iteration of the outer loop, iterates over the index variable j from the value 0 to the value i−1. In every iteration of the inner loop, the component in the ith row and the jth column of the array A is transferred.

The choice of this loop transformation is detailed below. For now, it can be seen that both transfer loop nests are equivalent since they reference the same data elements. But for the second transfer loop nest, the stride of the innermost loop is 1.

The order of transfers according to the second transfer loop nest is shown in FIG. 4(c). Only 5 transfers are necessary now.

This example was to illustrate the concept of the minimal stride in the innermost loop. There are a lot of more complex scenarios, where spatial locality is established by using a transfer order which achieves minimal stride in the innermost loop. For a person skilled in the art, it is no problem to think about such scenarios.

Preferably, minimal stride is achieved by executing a copy of the original loop nest with the loop body replaced by just a data access function for the array under consideration, to which copy a loop transformation is applied.

The applied loop transformation changes the order of data accesses and guarantees that the same data are accessed.

By using a transfer order such that minimal stride within the innermost transfer loop is achieved, spatial locality is established.

In the following, a preferred embodiment of the method according to the invention is explained. In particular, it is explained how minimal stride within the innermost loop of a transfer loop nest can be achieved.

FIG. 5 shows a flow diagram 500 illustrating an embodiment of the method according to the invention. The embodiment of the method according to the invention can for example be applied to an application programmed for the computer system illustrated in FIG. 3.

According to the invention, spatial locality is established for the transfer of affine-indexed array segments which are referenced in a loop nest.

So, let the considered application program comprise a loop nest wherein $\underline{i}=(i_1, \ldots, i_n)^T$ denotes the iteration vector of the loop nest. Here, $i_1$ is assumed to be the iteration index of the outermost loop. Accordingly, $i_n$ is the iteration index of the innermost loop. Further, the bounds of inner loop indices are assumed to be piecewise affine functions in outer loop variables and in q problem parameters. The latter are summarized in a vector $\underline{p}=(p_1, \ldots, p_q)^T$.

For simplicity, loop increments are assumed to be normalized to be one. This can be achieved by standard compiler transformations.

Then, the iteration space of the loop nest is a n-dimensional parameterised polytope $I=\{\underline{i} \in z^n | \underline{C}\underline{i}+\underline{F}\underline{p}+\underline{d} \leq 0\}$, where $\underline{C}$ is an r×n-matrix, $\underline{F}$ is an r×q-matrix and $\underline{d}$ is an r-dimensional constant vector ($r \geq 2n$).

Z denotes the set of all integer numbers.

Non perfect loop nests can be made perfect by standard compiler techniques like code sinking.

The array references are assumed to be parameterised by affine functions in the iteration vector and in the problem parameters.

A reference to an m-dimensional array A can thus be written in the form $A[\underline{H}\underline{i}+\underline{D}\underline{p}+\underline{c}]$, where $\underline{H}$ is an m×n-matrix, $\underline{D}$ is an m×p-matrix and $\underline{c}$ is an m-dimensional constant vector.

The array may be defined in the form
type $A[n_1] \ldots [n_m]$
(pseudo C style syntax), where type means the type of the array elements.

With $$B_1=n_2 \cdot \ldots \cdot n_m, B_2=n_3 \cdot \ldots \cdot n_m, \ldots, B_{m-1}=n_m,$$
$$B_m=1 \quad (1)$$

the distance between the two array references $A[a_1] \ldots [a_m]$ and $A[b_1] \ldots [b_m]$ is given by $$|B_1(b_1-a_1) \cdot B_2(b_2-a_2) \cdot \ldots \cdot B_m(b_m-a_m)|. \quad (2)$$

In the considered embodiment, the iteration vector $\underline{i}$ refers to the element loops within a tile of the array A, whereas the loop variables controlling the tiles themselves are subsumed in the parameter vector $\underline{p}$.

The considered iteration space I defines a single rectangular tile in form of a multi-dimensional box which in turn defines the polyhedral segment $A[\underline{H}I+\underline{D}\underline{p}+\underline{c}]$ that must be distributed to local memories, for instance the local memories 317 of the embodiment shown in FIG. 3.

In this embodiment, it is assumed that the matrix $\underline{H}$ in the reference $A[\underline{H}I+\underline{D}\underline{p}+\underline{c}]$ is non-singular.

Otherwise, a first transformation is done which projects the iteration space I to an equivalent iteration space from which the same data elements $A[\underline{H}I+\underline{D}\underline{p}+\underline{c}]$ are referenced. The restriction of the mapping $\underline{H}$ to the projected iteration space is non-singular again.

This procedure is not detailed in this embodiment but is described later with reference to FIG. 6.

The part $\underline{D}\underline{p}+\underline{c}$ of the index function referencing A is constant within the tile. So, $\underline{H}\underline{i}$ defines the relative addresses of the data elements referenced within a tile, whereas $\underline{D}\underline{p}+\underline{c}$ stands for the start address of these data (which in turn is relative to $A[\underline{0}]$).

In a preferred embodiment the tile size is chosen small enough such that the full data segment referenced via indexing from within the tile can be kept in local memory.

In one embodiment of the invention, the mapping of iteration vectors to physical processing elements, for instance the parallel processing elements of the parallel processing element array 305 of the embodiment shown in FIG. 3, is a block cyclic distribution of $i_n$, which is the innermost iteration index, with block size b.

This is expressed by the mapping $$\pi: I \to \{0, \ldots, PE\_CNT-1\} \ \underline{i} \mapsto \pi(\underline{i})=[(i_n+\delta)\text{div } b] \text{ mod } PE\_CNT \quad (3)$$

which defines a parallel processing element to which the datum $A[\underline{H}\underline{i}+\underline{D}\underline{p}+\underline{c}]$, $\underline{i} \in I$, shall be sent.

PE_CNT means the number of parallel processing elements and $\delta \in Z_+$ is a non negative offset.

Preferably, a second mapping $\alpha$ defines a relative local memory address for the datum $A[\underline{H}\underline{i}+\underline{D}\underline{p}+\underline{c}]$, $\underline{i} \in I$.

Let $I=\{0, \ldots, b_1-1\} \times \ldots \times \{0, \ldots, b_n-1\}$, $$\hat{b}_j = \begin{cases} b_j, & \text{if } j \neq n \\ b_n \text{div PE\_CNT}, & \text{if } j = n \end{cases} \quad (4)$$

and let $\alpha: I \to \{0, \ldots, LM\_SIZE-1\}$ be defined by $$\alpha(\underline{i}) = \sum_{j<n} i_j \cdot \hat{b}_{j+1} \cdot \ldots \cdot \hat{b}_n + (b \cdot (b \cdot [i_n \text{div}(b \cdot PE\_CNT)] + i_n \text{ mod } b) \quad (5)$$

where b is the block size of block cyclic distribution.

The mapping $\alpha$ is defined such that data are stored in local memory in exactly the order in which they are referenced.

The parallel processing element just needs to know the start address of a transferred data block in local memory and can then simply use address increments to subsequently access all data.

In the following, the process illustrated in FIG. 5 for organizing the data transfer of an affine-indexed segment of a multi-dimensional array such that spatial locality is established according to an embodiment of the method according to the invention is explained.

The process is started with step 501.

In step 502 it is tested if there are multiple references of the same array. This is done to avoid multiple transfers of the same array data when there is "group reuse".

The prototypical example is that of two references $A[\underline{H}\underline{i}+\underline{D}\underline{p}+\underline{c}]$ and $A[\underline{H}\underline{i}+\underline{D}\underline{p}+\underline{d}]$ appearing within the same loop nest.

If such a multiple reference is detected, the process continues with step 503.

In step 503, multiple references of the same array are treated as a single one if this is possible.

In the example of two references $A[\underline{H}\underline{i}+\underline{D}\underline{p}+\underline{c}]$ and $A[\underline{H}\underline{i}+\underline{D}\underline{p}+\underline{d}]$ appearing within the same loop nest it is necessary that both references exhibit the same index matrices $\underline{H}$ and $\underline{D}$.

Otherwise, in this embodiment, both arrays will be transferred separately to disjoint locations in local memories.

The second reference can equivalently be written as $A[\underline{H}\underline{i}+\underline{D}\underline{p}+\underline{c}+\underline{w}]$, with $\underline{w}=\underline{d}-\underline{c}$. It can also be written in form $A[\underline{H}(\underline{i}+\underline{u})+\underline{D}\underline{p}+\underline{c}]$, when there is an integer solution to the equation $\underline{H}\underline{u}=\underline{w}$ (which can be found by standard methods).

If such an integer solution does not exist, there is no reuse between both references and again they will be treated as separate transfer objects.

If $\underline{u} \in Z^n$ does exist, however, the second reference equals the first one, with translated iteration space. Both references are treated as a single one, resorting to a larger iteration space (the bounding box $\hat{I}$ of $I \cup (I+\underline{u})$).

For the addressing of the second reference in local memory, the constant offset $\underline{u}$ is used.

This example of the procedure for treating two array references as a single one can obviously be generalized to multiple references.

After deciding if multiple references can be treated as a single reference for the transfer and, if possible, after according adjustment of the iteration space, the process continues with step 504.

In step 504, it is tested if the index matrix $\underline{H}$ is singular. If this is the case, in this embodiment, data are transferred in the given order and spatial locality is not established, that is, the process stops with step 505.

If the index matrix $\underline{H}$ is not singular, the process continues with step 506.

According to this embodiment of the invention, a transfer loop nest which establishes spatial locality for the transfer of the data $A[\underline{Hi}+\underline{Dp}+\underline{c}]$, $\underline{i} \in I$ is determined. This transfer loop nest is executed on a independently programmable data transfer unit, for example the first data transfer unit 314 of the embodiment shown in FIG. 3.

Transferring data in the order given by the original loop nest means a stride defined by $\underline{He}^n$ in the innermost loop, where $\underline{e}^n = (0, \ldots, 0, 1)^T$.

In this embodiment, the array layout in memory is according to the C conventions, that is, arrays are stored in memory line by line. Further, data transfers occur in blocks of contiguous bytes.

Transferring data in the order given by the original loop nest means a stride defined by $\underline{He}^n$ in the innermost loop, where $e^n = (0, \ldots, 0, 1)^T$ is the direction in which the iteration space is traversed in the innermost loop.

Minimal stride is achieved by proceeding through the iteration space in a direction $\underline{t} \in \hat{I}$ such that for $\underline{y} = \underline{Ht}$ $|y_1 \cdot B_1 + \ldots + y_m \cdot B_m|$ is minimal.

Such a direction $\underline{t} \in \hat{I}$ can be found as the solution of an integer linear program:

minimize $$y_1 \cdot B_1 + \ldots + y_m B_m \text{ for } \underline{t} \in Z^n \quad (6)$$

under the constraints $$y_1 \cdot B_1 + \ldots + y_m \cdot B_m > 0, |t_i| \leq b_i \forall i \quad (7)$$

Each nonlinear constraint $|t_i| \leq b_i$ can be transformed into two linear constraints.

Here, $b_i$ means the length of the tile $\hat{I}$ in ith dimension.

Then, by a classical result of Hermite (see Alexander Schrijver, Theory of Linear and Integer Programming, Wiley, 2000, p. 78), a unimodular matrix $\underline{T}$ can be found, containing the vector $\underline{t}$ as last column. Applying the linear transformation $\underline{T}$ to the transfer loop nest yields an innermost loop with minimal stride.

The transfer loop nest is generated by the transformation $$\underline{i}' = \underline{T}^{-1} \underline{i}, \ \hat{I}' = \underline{T}^{-1} \hat{I} \quad (8)$$

The vector $\underline{t}$ gained by this procedure can have rather large norm $\|\underline{t}\|$.

This means that the full iteration space $\hat{I}$ is traversed in a few steps only when following direction $\underline{t}$.

This in turn means a short innermost loop of the transfer loop nest and this means that despite minimal stride the transfer buffer may only be filled poorly, i.e. the ratio between transferred and used data is poor.

To alleviate this problem, a direction $\underline{t}$ is used which provides sub-optimal stride only.

This can be achieved by tightening the constraints $|t_i| \leq b_i$ to $|t_i| \leq b_i / K$.

Alternatively, according to step 506 of FIG. 5, the solution of an integer linear program can be avoided by proceeding in the following way.

By using, preferably, the generalized Euclidean algorithm described in Alexander Schrijver (cited above), p. 45 f., a unimodular matrix $\underline{T} \in Z^{n,n}$ (i.e. $\underline{T} \in Z^{n,n}$ with $\det(\underline{T}) = \pm 1$) is calculated such that $\underline{HT} = \underline{H}'$ is in lower triangular echelon form.

Any system $\underline{Ht} = \underline{y}$ can equivalently be transformed to $\underline{H't'} = \underline{y}$, $\underline{H}' = \underline{HT}$, $\underline{t}' = \underline{T}^{-1} t$ and it can be seen (see Alexander Schrijver (cited above)) that $\underline{Ht} = \underline{y}$ has a solution $\underline{t} \in Z^n$ if and only if $\underline{H't'} = \underline{y}$ has a solution $\underline{t} \in Z^n$.

The idea is to solve the system $\underline{Ht} = k \cdot \underline{e}^m$ for minimal $k > 0$, if possible, since $\underline{e}^m$ is the ideal of a minimal stride vector.

If such a solution does not exist, a solution of $\underline{Ht} = k \cdot \underline{e}^{m-1} + l \cdot \underline{e}^m$ for minimal $k > 0$ is sought for, and if it does not exist, a solution of $\underline{Ht} = k \cdot \underline{e}^{m-2} + l \cdot \underline{e}^{m-1} + r \cdot \underline{e}^m$ for minimal $k > 0$ is sought for, and so on.

From the echelon form of $\underline{H}'$ one can see that $\underline{y} = \underline{H}' \underline{e}^n$ defines the right hand side of our system which best approaches our ideal and for which a solution does in fact exist, and that this solution is given as $\underline{t} = \underline{Te}^n$.

By proceeding in direction $\underline{t} = \underline{Te}^n$ in the innermost loop of the transfer loop nest, sub-optimal stride is achieved. The corresponding transformation of the transfer loop nest is given by equation (8).

In step 507 further loop transformations are considered.

Namely, loop permutations and loop reversals as the only transformations of the transfer loop nest are considered.

It is well known that a combination of loop permutations and loop reversals forms a single unimodular loop transformation.

In the following, such a loop transformation is called primitive. For a given loop nest of depth n, there are $2^n \cdot n!$ primitive transformations.

Given that in practice $n \leq 4$, all of these can be tried out to find the minimal stride achievable by primitive transformations. Primitive transformations have the advantage that they leave the loop bounds of the transfer loop nest constant.

It is easy then to fuse the two (or three) innermost loops of the transformed loop nest under the following condition. If the innermost loop has stride $s_n$ and length $b_n$, and if the second innermost loop nest has stride $s_{n-1}$ and length $b_{n-1}$, then both loops can be combined (fused) to give a single loop of length $b_n \cdot b_{n-1}$ and stride $s_n$, if $s_{n-1} = s_n \cdot b_n$.

Even more loops can be fused. Loop fusion leads to a better utilization of the transfer buffer in case of small data arrays to be transferred. Primitive loop transformations including potential loop fusion are considered in step 507.

In step 508 a decision is made whether the general unimodular transformation or the primitive transformation (plus eventual loop fusion) is better suited to achieve spatial locality.

If N is the number of data elements fitting into a transfer buffer, if s is the achieved stride in the innermost loop for either approach, and if b is the length of either innermost loop (after eventual loop fusion, for the second approach), then the ratio between used and actually transferred data is $b \cdot s / N$ in case $b \cdot s < N$ and is $1/s$, else.

The kind of transformation is chosen which yields the better ratio.

The transformation matrix $\underline{T}$ is chosen according to the chosen transformation, i.e., $\underline{T}$ is chosen as determined above or is chosen as the transformation matrix of the primitive transformation, if the primitive transformation yields the better ratio.

In step 509, the iteration space $\hat{I}'$ of the transformed transfer loop nest is calculated accordingly by equation $$\hat{I}'=\underline{T}^{-1}\hat{I} \qquad (9)$$

In step 510 a loop nest corresponding to the polytope $\hat{I}'$ is generated, preferably by the polyhedral scanning method (see Saman Prabhath Amarasinghe, Parallelizing Compiler Techniques Based on Linear Inequalities, Dissertation University of Stanford, 1997, Corinne Ancourt, Francois Irigoin, Scanning Polyhedra with DO Loops, 3rd ACM SIGPLAN Symposium on Principles and Practice of Parallel Programming, 39-50, 1991).

According to the above loop transformation, each time the iteration vector $\underline{i}$ before the loop transformation $\underline{Ti}'$ has to be used after the loop transformation.

In particular, in step 511, the formulas used in this embodiment for $\pi$ and $\alpha$ are rewritten in $\underline{i}'$-coordinates.

Considering first $\pi$, the formula reads $$\pi(\underline{i})=\pi(\underline{Ti}')=[((\underline{Ti}')_n+\delta)\text{div } b] \text{ mod } PE\_CNT \qquad (10)$$

This means that running through the kth loop of the transfer loop nest, $(\underline{Te}^k)_n = t_n^k$ defines a parallel processing element increment from one iteration step to the next.

Outside the innermost loop, $\pi(\underline{Ti}')$ is computed directly for given $\underline{i}'$. Inside the innermost loop, the following sequence of parallel processing elements are served $$z_k=[(kx+y)\text{div } b] \text{ mod } PE\_CNT, k=k_0, k_0+1, \qquad (11)$$

where $x=(\underline{Te}^n)_n \in Z$, $y=\delta+(\underline{Ti}')_n \in Z_+$ and where $k_0$ is the start value of the inner loop variable.

The sequence with the components $z_k$ is a periodic sequence of maximal periodicity $b \cdot PE\_CNT$.

In case $x=0$ it assigns all elements to the same, constant parallel processing element.

In general, it corresponds to the following sequence of PE increments $$y_k=[((k+1)x+y)\text{div } b]-[(kx+y)\text{div } b], k=k_0, k_0+1, \qquad (12)$$

which are counted modulo PE_CNT.

In the following, the trivial case $x=0$ is excluded.

Then, the sequence $(y_k)_k$ has got a period of length $\beta=b/\gamma$ where $\gamma=\gcd(x,b)$ is the greatest common divisor of $x$ and $b$. If the auxiliary sequence $\zeta_k$ is defined by $$\zeta_k=[((k+1)x)\text{div } b]-[(kx)\text{div } b], k=0, 1, \ldots, \beta-1 \qquad (13)$$

which is independent of the value of $\underline{i}'$ at the beginning of the innermost loop and which is, in this embodiment, computed at compile time, then there is an integer $s_0(y)$ (dependent on $y$, i.e. on $\underline{i}'$) such that $$y_k=\zeta(k+s_0(y))\text{mod } \beta, k=k_0, k_0+1, \qquad (14)$$

The integer $s_0(y)$ is computed as follows.

Let $r_0(y)=(y \text{ mod } b)\text{div } \gamma$, such that for some positive integer $v \in N$ the equation $y=\delta y + r_0(y)\cdot\gamma + v\cdot b$ with $0 \leq \delta y < \gamma$ and $0 \leq r_0(y) < \beta$ holds.

From this one gets $(y+kx)\text{div } b=(r_0(y)\cdot\gamma+kx)\text{div } b+v$ where $v$ does not depend on $k$.

Next, $s_0(y)=\min\{\tau \in N | (\tau \cdot x) \text{ mod } b = r_0(y)\cdot\gamma\}$ is set, such that $s_0(y)x=r_0(y)\cdot\gamma+\rho\cdot b$ for some $\rho \in Z$.

This means that $$(s_0(y)x+kx)\text{div } b=(r_0(y)\cdot\gamma+kx)\text{div } b+\rho \qquad (15)$$

where $\rho$ does not depend on $k$. Building differences one sees that $y_k=\zeta(k+s_0(y)) \text{ mod } \rho$, $k=k_0, k_0+1, \ldots$ The sequence $\zeta_k$ can always be extended by periodic continuation to a sequence of length $b$.

In that case $$y_k=\zeta(k+s_0(y))\text{mod } b, k=k_0, k_0+1, \qquad (16)$$

holds.

By calculating the $\zeta_k$ at compile time and calculating $s_0(y)$ at run time, $y_k$ can be calculated with the above formula in a simple way, thus, low performance resulting from a complex calculation of $\pi$, which might counterbalance the performance gain due to establishing spatial locality, is avoided in this embodiment.

In an embodiment where the transfer units do not support such varying parallel element increments, a cyclic distribution of iteration indices is used instead of a block-cyclic distribution. Then, the parallel element increment is constant and simply equals $(\underline{Te}^n)_n = t_n^n$ (to be counted modulo PE_CNT).

Also, $\alpha$ is expressed in $\underline{i}'$-coordinates. The formula for $\alpha$ reads $$\alpha(\underline{i}) = \alpha(\underline{Ti}') \qquad (17)$$

$$= \sum_{j<n}(\underline{Ti}')_j \cdot \prod_j + (b \cdot [\underline{Ti}']_n \text{div}(b \cdot PE\_CNT)] + (\underline{Ti}')_n \text{mod } b)$$

where $\Pi_j = b_{j+1} \cdot \ldots \cdot b_n$.

Again this address is computed for fixed values of $\underline{i}'$ outside the innermost loop and pre-computed address increments are used inside the innermost loop.

The iteration index increment for $\underline{i}'$ inside the innermost loop is $\underline{e}^n$, so the address increments are given by $$y_k=\alpha(\underline{Ti}'+(k+1)\underline{Te}^n)-\alpha(\underline{Ti}'+k\underline{Te}^n), k=k_0, k_0+1, \qquad (18)$$

Here, $k_0$ is the start value of the inner loop variable.

Setting $x=(\underline{Te}^n)_n \in Z$, $y=(\underline{Ti}')_n \in Z_+$ and abbreviating $B=b \cdot PE\_CNT$, the equation for $y_k$ takes the form $y_k=u_k+v_k+w_k$ with constant increments $$u_k = \sum_{j<n}(\underline{Te}^n)_j \cdot \prod_j = \sum_{j<n}t_j^n \cdot \prod_j = \text{const} \qquad (19)$$

which are computed at compile time and $$w_k=((k+1)x)\text{mod } b - (kx)\text{mod } b \qquad (20)$$

$$v_k=([(y+(k+1)x)\text{div } B]-[(y+kx)\text{div } B])b \qquad (21)$$

It was already detailed for the computation of $\pi$ how an integer $s_0(y)$ is found such that $v_k=\xi(k+s_0(y)) \text{ mod } B$ for the sequence $\xi k=[((k+1)x)\text{div } B-(kx)\text{div } B]b$, $k=0, \ldots, B-1$, which is not dependent on $\underline{i}'$ (i.e. also not dependent on $y$) and which is pre-computed at compile time.

So, at compile time, the sequences $\xi_k, w_k, k=0, \ldots, B-1$, and $u_k=u_0$ are pre-computed and at run time the address increments $$y_k=\zeta(k+s_0(y))\text{mod } B + w_k \text{ mod } b + u_0, k=k_0, k_0+1, \qquad (22)$$

are used where only start address $\alpha(\underline{i}')$ and start index $s_0(\underline{i}')$ must be computed at run time outside the innermost loop.

Again, in an embodiment where a cyclic distribution of iteration indices is used, the formulas become easier.

In this case, b=1, $w_k$=0 and the sequence of $\xi_k$ and $\zeta_k$ has just the length PE_CNT.

Having thus adapted the formulas for $\pi$ and $\alpha$ to the transformed loop nest, the process for organizing the data transfer is stopped with step 512.

Another embodiment of the computer system according to the invention is similar to the one illustrated in FIG. 3, but the load transfer between the shared memory and the local memories is organized in two stages as in the embodiment illustrated in FIG. 2.

In the first stage data are transferred from the shared memory into a load buffer while in the second stage the contents of the load buffer are transferred into the local memories. In one embodiment, the transfer buffer can be filled using unit strided accesses only. Further, the content of the transfer buffer can be broadcast to all local memories simultaneously or can be distributed to subsets of local memories, each datum from the buffer being sent to a single local memory. Store transfers work analogously.

If in this embodiment despite application of the loop transformation according to the matrix $\underline{T}$ stride-1-access to data in shared memory can not be achieved, additional data will appear in the transfer buffer, since it can be only filled using unit strided accesses. This data have to be suppressed when writing the transfer buffer into local memories.

This means that in this embodiment, the data transfer units are preferably adapted to be able to perform read/write access between transfer buffer and local memories with a constant stride.

Otherwise, invalid data will necessarily appear in local memories and an additional scaling factor needs to be incorporated into-function $\alpha$.

In the following, a preferred strategy concerning the tile size is explained. The strategy concerns an embodiment of a computer system which comprises transfer buffers, as described above and as in the embodiment illustrated in FIG. 2.

Generally, temporal locality can be better captured by larger tile sizes than by smaller ones. Temporal locality is of no direct concern for the case of non-singular array references, which do not expose temporal reuse at all, but other array references within the same loop nest which do exhibit reuse might give rise to the wish of choosing large tile sizes.

Hence, there is the possible wish not to transfer in one shot all data indexed from within a tile in order to save local memory. The following strategy is preferred.

If $\sigma'$ is the minimal stride for the transformed transfer loop nest and $\beta$ is the size of the transfer buffer, the integer $\mu$, which is the maximal integer such that $\mu \cdot \sigma' \leq \beta$, is the minimal number of iterations needed in the innermost loop of the transformed transfer loop nest necessary to fill at least one transfer buffer with data.

The corresponding loop increments in the original transfer loop nest are 0, $\underline{Te}''$, $2\underline{Te}''$, ..., $(\mu-1)\underline{Te}''$.

Thus, at least $\mu \cdot (\underline{Te}'')_1$ iterations of the outer loop are performed in order to get full transfer buffers in the transformed loop nest.

Accordingly, the original tile size is preferably partitioned into slices of width $\mu \cdot (\underline{Te}'')_1$ and each tile is transferred separately.

FIG. 6 shows a flow diagram 600 illustrating another embodiment of the method according to the invention.

In the embodiment described above with reference to FIG. 5, the process for generating a transfer loop nest to be executed on a data transfer unit is stopped with step 505, if the index matrix $\underline{H}$ does not have maximum rank.

In the embodiment described now with reference to FIG. 6, the case in which the matrix $\underline{H}$ does not have maximum rank is considered.

In this case, it is possible to establish temporal locality for the data transfer from a first memory to a second memory by generating suitable transfer loop nest and executing it on a independently programmable data transfer unit like the data transfer unit 102 shown in FIG. 1.

In step 601, the process is started.

The steps 602, 603 and 604 are the same as the steps 502, 503 and 504 of the embodiment described with reference to FIG. 5, however, the process continues with step 606 if the index matrix $\underline{H}$ as described above does not have maximum rank and the process stops with step 605 if the matrix $\underline{H}$ does have maximum rank.

If the process is stopped with step 605, the process described with reference to FIG. 5 can be carried out instead.

In step 606, the null-space $\ker(\underline{H})$ of the matrix $\underline{H}$ is determined.

This is done by determining, preferably by the Euclidean algorithm which is described, e.g., in Alexander Schrijver (cited above) (page 45 f.), a unimodular matrix $\underline{U} \in Z^{n,n}$, (unimodular means $|\det(\underline{U})|$=1), such that $$\underline{HU} = (\underline{L}, 0), \quad (23)$$

wherein the matrix $\underline{L} \in Z^{n,r}$ is in lower triangular echelon form and the last n-r columns of $\underline{HU}$ are zero.

Then, r=rank($\underline{H}$).

The last n-r columns of $\underline{U}$ are denoted by $\underline{x}^1, \ldots, \underline{x}^{n-r} \in Z^n \backslash \{0\}$.

With this denotation, the equation $$\underline{Hx}^j = 0, \, j=1, \, n-r \quad (24)$$

holds.

Moreover, the vectors $\underline{x}^j$ form a basis of the linear space $\ker(\underline{H})$, i.e., $\ker(\underline{H}) = <\underline{x}^1, \ldots, \underline{x}^{n-r}>$ (see Alexander Schrijver (cited above), p. 58).

In the following, the vectors $\underline{x}^j$ are called reuse vectors and $\ker(\underline{H})$ is called reuse space, since every two indices $\underline{i}$ and $\underline{i}+\underline{x}$, $\underline{x} \in \ker(\underline{H})$, refer to the same data element, i.e.:

$$A[\underline{Hi}+\underline{Dp}+\underline{c}]A[\underline{H}(\underline{i}+\underline{x})+\underline{Dp}+\underline{c}] \; \forall \underline{x} \in \ker(\underline{H}) \quad (25)$$

In step 607, integers $j_1 < \ldots < j_r$ from the set $\{1, \ldots, n\}$ are determined such that the matrix $$\underline{T} = (\underline{e}^{j_1}, \ldots, \underline{e}^{j_r}, \underline{x}^1, \ldots, \underline{x}^{n-r}) \in Z^{n,n} \quad (26)$$

is not singular.

Here, $\underline{e}^{j_k} \in Z^n$ means the $j_k$th canonical unit vector, i.e. the vector having 1 in its $j_k$th component and having 0 in all other components.

Further below, an preferred choice of the matrix $\underline{T}$ will be described.

In step 608 and step 609, the transfer loop is generated. This happens in the following way.

Let $J = \{j_1, \ldots, j_r\}$ and $K = \{1, \ldots, n\} \backslash \{j_1, \ldots, j_r\} = \{k_1, \ldots, k_{n-r}\}$.

For a given vector $\underline{x} \in Z^n$ the abbreviations $\underline{x}_J = (x_{j_1}, \ldots, x_{j_r})$ and $\underline{x}_K = (x_{k_1}, \ldots, x_{k_{n-r}})$ are used in the following.

Let further $\underline{B} = (\underline{x}_K^1, \ldots, \underline{x}_K^{n-r}) \in Z^{n-r,n-r}$.

B can be brought into Hermite Normal Form $$BU_1 = \begin{pmatrix} d_1 & 0 & \ldots & \ldots & 0 \\ * & d_2 & 0 & \ldots & \ldots \\ * & * & \ldots & 0 & \ldots \\ * & * & * & \ldots & 0 \\ * & * & * & * & d_{n-r} \end{pmatrix} \quad (27)$$

wherein $U_1$ is a unimodular matrix and $d_k>0$, $k=1, \ldots, n-r$ are integer numbers.

A number of $$\prod_{k=1}^{n-r} d_k = |\det(B)| = |\det(T)|$$

different vectors $q=(q_1, \ldots, q_{n-r}) \in \{0, \ldots, d_1-1\} \times \ldots \times \{0, \ldots, d_{n-r}-1\} =: \overline{Q}$ is used.

These vectors are lifted up to vectors $i(q) \in Z^n$ such that $$i(q)_K = q, \quad i(q)_J = 0 \quad (28)$$

It can be seen that for every $i \in I$ there exists a unique $q \in \overline{Q}$ and a unique $z \in Z^n$ such that $$i = i(q) + Tz \quad (29)$$

holds.

It suffices to consider only those vectors $i(q) \in Z^n$ which are also elements of I. Therefore, the space $$Q := \{q \in \overline{Q}; i(q) \in I\} \quad (30)$$

is used.

The determination of Q from $\overline{Q}$ is a simple matter of checking for all candidates whether $i(q) \in I$.

For each q, $I_q$ denotes in the following the polytope:

$$I_q = \{z \in Z^n | i(q) + Tz \in I\} \quad (31)$$

Before it is transformed, the transfer loop nest has, as above, the form of the processing loop nest with only a data access function in the loop body.

Since the non-transformed transfer loop nest loops over all indices i from the iteration space I, it can be written in pseudo-programming language as for $i \in I$
    (TLN0)
    A[Hi+Dp+c]

where the pseudo loop stands for a loop nest of depth n which is generated according to the Iteration space I.

The loop body consists only of a data access function which is indicated by A[Hi+Dp+c].

Generation of a loop nest according to an iteration space is done preferably by the polyhedral scanning method (see Saman Prabhath Amarasinghe (cited above), Corinne Ancourt et al. (cited above)).

This transfer loop nest (TLN0) is now transformed to the equivalent one for $q \in Q$
    for $z \in I_q$
      (TLN0')
      A[Hi(q)+HTz+Dp+c]

This means that the non-transformed loop nest (TLN0) is transformed to a loop nest (TLN0') with an outer loop nest generated according to the iteration space Q and with an inner loop nest generated according to the iteration spaces $I_q$.

The loop body still consists only of a data access function which is indicated by A[Hi(q)+HTz+Dp+c].

By definition of T the last n-r columns of HT are equal to 0.

This means that for each iteration of the innermost n-r loops for the same iteration of the r outer loops of the loop nest generated according to the iteration spaces $I_q$, the same data elements of A are accessed.

Therefore, the innermost n-r loops need not to be executed for the purpose of a data transfer.

Now, the polytopes $I_q$ are projected to the first r dimensions of $Z^n$, i.e., the transfer loop nest (TNL0') is transformed to for $q \in Q$
    for $Pz \in PI_q$
      (TNL0'')
      A[Hi(q)+HTPz+Dp+c]

where the linear mapping P, which corresponds to a matrix $P \in Z^{r,n}$, is the projection from $Z^n$ to $Z^r$ defined by stripping off the last n-r components of the vectors in $Z^n$.

This means that the non-transformed loop nest (TNL0) is now transformed to a loop nest (TNL0'') with an outer loop nest generated according to the iteration space Q and with an inner loop nest generated according to the iteration spaces $PI_q$, which are the projections of the iteration spaces $I_q$.

The loop body still consists only of a data access function which is indicated by A[Hi(q)+HTPz+Dp+c].

In general, the iteration spaces $PI_q$ can contain holes and are not necessarily polytopes, such that there might arise problems in the generation of a loop nest according to the iteration spaces $PI_q$.

Therefore, $PI_q$ is replaced by its convex hull $CPI_q$=conv.hull($PI_q$) (see Alexander Schrijver (cited above), p. 6) to get a polytope again and to be able to generate a loop nest without problems.

Resorting to the convex hull means, however, that more data elements will be transferred than necessary.

This is not a problem for read transfers, but for write transfers special care must be taken in order not to overwrite valid shared memory.

The effect can be counterbalanced by an invalidation mechanism of the hardware, as it is also implemented for caches.

The mechanism works in the following way:

All local memory allocated for a multidimensional array is invalidated before processing begins, such that all data transferred from shared to local memory are marked invalid.

Only when a parallel processing element writes to a local memory address the address value will be validated (the processing loop nest is different from the transfer loop nest and is guaranteed to perform only valid iterations).

Finally, only valid local memory data are written to the shared memory, transfers of invalid data are formally executed, but can not change shared memory contents.

The not-transformed transfer loop nest (TNL0) is thus finally transformed to the transfer loop nest for $i'_K \in Q$
    for $i'_J \in CPI_{i'_K}$ (TLN1)
      ... A[Hi'+Dp+c] ...

This means that the non-transformed loop nest (TNL0) is now transformed to the transfer loop nest (TLN1) with an outer loop nest generated according to the iteration space Q and with an inner loop nest generated according to the iteration spaces $CPI_q$, which are the convex hulls of the projections of the iteration spaces $I_q$.

The loop body consists only of a data access function, indicated by A[Hi'+Dp+c].

Every two different indices $i'$ defined by the transfer loop nest (TLN1) refer to different elements of the array A, and, except for resorting to the convex hull, the set of indices $i'$ is minimal for referencing A[Hi+Dp+c].

Therefore, the transfer loop nest (TNL1) in iteration variable $i'$ is used to transfer the set $\{A[Hi+Dp+c], i \in I\}$.

In equation (29), each iteration index from the iteration space I is written as a decomposition.

This decomposition is given by a nonlinear mapping $f:i' \mapsto i'=(i'_K, i'_J)$ which will be defined in the following and which corresponds to the iteration indices $i'_K, i'_J$ used in the transfer loop nest (TLN1).

For every $i \in I$, there exist a unique $q \in Q$ and a unique $z \in Z^n$ such that $i=i(q)+Tz$.

These are computed as follows.

First, $q_l = i_{K_l} \mod d_l$, $l=1, \ldots, n-r$ is set and thus $i(q)_K = q$ and $i(q)_J = 0$, wherein the factors $d_l$ are given by the Hermite Normal Form BU, see equation (27).

The last n-r components $y \in Z^{n-r}$ of $z$ are given by the solution of the linear system $By = i_K - i(q)_K$ and are easily obtained via backward substitution since $B$ is lower triangular.

With its last n-r components now determined, the first r components $w \in Z^r$ of $z$ can be read off $w = i_J - (T \cdot (0, y)^T)_J$.

This gives $i'_J = w$ and $i'_K = q$.

In step 610, similar to the embodiment described with reference to FIG. 5 above, a formula for the distribution of iteration indices, which corresponds to a distribution of work to the parallel processing elements, and a formula for the definition of the addresses in the local memories are expressed in $i'$-coordinates.

The formula for the distribution of iteration indices corresponds as above to an allocation function for cyclic distribution of iteration indices and is given by $$\alpha: I \to \{0, \ldots, PE\_CNT-1\}, i \mapsto \pi(i)=(i_n+\delta) \mod PE\_CNT \quad (32)$$

where PE_CNT means the number of parallel processing elements, and $\delta \in Z_+$ is a non negative constant offset to be chosen freely.

This mapping of iteration indices to parallel processing elements has to be expressed in the $i'$-coordinates of the transfer loop nest (TLN1).

At first, it is assumed that $j_r = n \in J$, which can be achieved for $e^n \notin \ker H$, i.e. when the allocation direction is no reuse direction.

In this case, for $i(q)$ and $z$ defined by $i=i(q)+Tz$, $i \in I$, the equation $i(q)_n = 0$ holds.

Thus, the allocation function can equivalently be written as $$\pi(i)=((Tz)_n+\delta) \mod PE\_CNT, \text{ where } i=i(q)+Tz. \quad (33)$$

According to the transfer loop nest (TLN1), the first r components of $z$ (which are denoted by $i'_J$ or Pz) are only used and, because of $j_r = n$, the allocation function $$\pi'(i)=((TPz)_n+\delta) \mod PE\_CNT=(i'_n+\delta) \mod PE\_CNT \quad (34)$$

is used instead of $\pi$.

This means that every data element as accessed by the transfer loop nest (TLN1) is sent to a single local memory, and, for the data elements addressed by the first iteration $i''$ through the innermost n-r loops one even has $\pi(i'') = \pi'(i'')$.

In general, however, $\pi(i'') \neq \pi'(i'')$.

In such a case, communication is needed: in the iteration corresponding to the index vector $i$, the element A[Hi+Dp+c] is needed on the parallel processing element $\pi(i)$, but actually is located on the parallel processing element $\pi'(i)$.

It has therefore to be communicated from a number of $$\omega(i) = \pi(i) - \pi'(i) = \left(\sum_{k=r+1}^{n} T_{n,k} z_k\right) \mod PE\_CNT \quad (35)$$

parallel processing elements to the right, i.e. in the direction of increasing index of the parallel processing elements.

Here, $z$ is as above given by $i=i(q)+Tz$, $(z_{r+1}, \ldots, z_n) = i'_K$.

The elements $T_{n,k}$ of $T$ are the last components of the reuse vectors and it can be seen that there is communication whenever the reuse space is not orthogonal to the allocation space, which is in this example the space spanned by the vector $e^n$.

For deriving the communication width from (35) a linear system to get $z$ from $i$ has to be solved.

In the innermost processing loop the situation is simpler.

Let $i=i''+ke^n$ be the iteration indices corresponding to the innermost processing loop, wherein $i''$ is determined by the outer loops and k is running through an interval defined by the bounds of the innermost loop.

Then it can be directly verified from (34) that $\omega(i)=\pi(i'')-\pi'(i'')$, i.e., the communication width is constant in the innermost loop and is defined by the outer loop indices.

In the following, the case that $e^n$ is a reuse vector is considered.

In this case in the innermost processing loop a single data element is used throughout that loop, and by all parallel processing elements simultaneously.

In this case it is preferred not to distribute, but to broadcast that element to all parallel processing elements.

Broadcast means that all data elements to be transferred are sent to all parallel processing elements simultaneously. Broadcast is preferably supported by the data transfer units and in this embodiment does not have to occur via parallel processing element communication.

Thus it is an efficient method of data transfer with the sole disadvantage of higher consumption of local memory. An allocation function is not needed in the broadcast case.

As mentioned above, in step 610, a formula for the definition of the addresses in the local memories is expressed in $i'$-coordinates, too.

A local memory address for every data element A[Hi+Dp+c], $i \in I$ using the components of $i'$ is defined.

For that, the bounding box of all indices $i'$ is used, i.e., a vector $v \in Z^r$ and positive integers $b_k \in Z_+$, $k=1, \ldots, r$ are determined such that $\vec{v} + \{0, \ldots, b_1-1\} \times \ldots \times \{0, \ldots, b_r-1\}$ is the integral bounding box of $$\bigcup_{q \in Q} CPI_q.$$

Further, positive integers $c_k \in Z_+$, $k=1, \ldots, n-r$ are determined such that $\overline{Q} \supseteq \{0, \ldots, c_1-1\} \times \ldots \times \{0, \ldots, c_{n-r}-1\}$ is the integral bounding box of Q.

Let the vector $\lambda \in Z^n$ be defined by its components:

$$\lambda_{j_r}=1, \lambda_{j_{r-1}}=b_r \text{ div } PE\_CNT, \lambda_{j_{r-2}}=\lambda_{j_{r-1}} \cdot b_{r-1}, \ldots, \lambda_{j_1}=\lambda_{j_2} \cdot b_2 \quad (36)$$

$$\lambda_{k_{n-r}}=\lambda_{j_1} \cdot b_1, \lambda_{k_{n-r-1}}=\lambda_{j_{n-r}} \cdot c_{n-r}, \ldots, \lambda_{k_1}=\lambda_{k_2} \cdot c_2 \quad (37)$$

With these denotations, the following addressing function α: I→N is used in this embodiment:

$$\alpha(\underline{i}) = \sum_{s=1}^{n-r} i'_{k_s} \cdot \lambda_{k_s} + \sum_{s=1}^{r-1} (i'_{j_s} - v_s) \cdot \lambda_{j_s} + (i'_{j_r} - v_r) \text{div } \text{PE\_CNT} \quad (38)$$

The above bounding box was defined to derive a simple enumeration scheme for i'-indices in analogy to row major memory layout of matrices.

Accordingly, local memory of size $\lambda_{k_1} \cdot c_1$ must be allocated for reference A, but only the data specified in the transfer loop nest (TLN1) will actually be transferred between shared and local memory.

In case data will not be distributed among the parallel processing elements, but will be broadcast to all parallel processing elements simultaneously, instead of (38) the following formula is used, $$\alpha(\underline{i}) = \sum_{s=1}^{n-r} i'_{k_s} \cdot \lambda_{k_s} + \sum_{s=1}^{r} (i_{j_s} - v_s) \cdot \lambda_{j_s} \quad (39)$$

with the redefinition $\lambda_{j_{r-1}} = b_r$.

The address function according to (38) is well suited for data distribution according to the transfer loop nest (TLN1), which is a loop nest in i', but is also easily computable for given $\underline{i} \in I$, in order to access data quickly in local memory for processing.

Computing every i' from i as indicated above via solution of a linear system of equations is prohibitive.

However, there are constant address increments for (38) in the innermost processing loop which can be pre-computed once and for all at compile time.

This can be directly read off equation (39) in the broadcast case, i.e., when $\underline{e}^n \in \text{Ker } H$.

This is explained in the following for the opposite case $\underline{e}^n \notin \text{Ker } H$, i.e., $j_r = n$.

The innermost processing loop on the parallel processing element with number p (p ∈ {0, . . . , PE_CNT−1}) corresponds to iteration indices $$\underline{i} + (s \cdot \text{PE\_CNT} + p)\underline{e}^n, \ s = 0, 1, \quad (40)$$

where i is defined by the outer loops.
Since $j_r = n$, the equation $$f(\underline{i} + (s \cdot \text{PE\_CNT} + p)\underline{e}^n) = f(\underline{i}) + (s \cdot \text{PE\_CNT} + p)\underline{e}^r \quad (41)$$

holds despite the general non-linearity of f (p. 54 f.) and this means that (38) defines an address increment of 1 also for the innermost processing loop.

In step 611, the optimal order for transferring all data accessed in the transfer loop nest (TLN1) is determined, i.e., the transfer loop nest is again transformed to establish spatial locality.

This can be achieved like in the embodiment described above with reference to FIG. 5 by first substituting the transfer loop nest (TLN1) with a loop nest having a polyhedral iteration space:

for $\underline{i}'_K \in Q$
   for $\underline{i}'_J \in \text{conv.hull}(\cup_{\underline{i}'_K \in Q} \text{CPI}_{\underline{i}'_K})$
     (TLN2)
     A[H<u>i</u>'+D<u>p</u>+<u>c</u>]

This means that the transform loop nest (TLN1) is transformed to a loop nest (TLN2) with an outer loop nest generated according to the iteration space Q and with an inner loop nest generated according to the convex hull of the union of the iteration spaces $\text{CPI}_q$, wherein the loop body consists only of a data access function indicated by A[H<u>i</u>'+D<u>p</u>+<u>c</u>].

Further, according to the embodiment described above with reference to FIG. 5, spatial locality can be established by second, applying a stride minimizing unimodular transformation to the transfer loop nest (TLN2), wherein the transformation matrix will have the reuse vectors as last components.

However, since rank(H)=r<n and since all iteration indices from the transfer loop nest (TLN2) refer to different array data, the resulting loop nest will have n-r inner loops of just length 1: no new data elements are accessed in the inner loop, but the iteration indices must be computed nevertheless in order to evaluate functions π and α.

Achieving minimal stride will thus not help much in this case, since π and α must be computed anew for each single element to be distributed, which is prohibitive.

Instead, preferably the following alternative strategy is used, with which not always minimal stride and thus no optimal spatial locality is achieved, but which is practically feasible.

According to this strategy, in a first step, stride minimization is performed by applying a unimodular transformation S: $Z^r \to Z^r$ just to the inner loop nest, which corresponds to "for $\underline{i}'_J \in \text{CPI}_{\underline{i}'_K}$" of the transfer loop nest (TLN1), i.e., the loop nest generated according to the iteration spaces $\text{CPI}_q$.

Let σ be the minimal stride achieved this way.

The formulae for π and α can be adapted to new indices $S\underline{i}'_J$ in a similar way as this happens in the embodiment described above with reference to FIG. 5.

In a second step, if there is an outer loop $\underline{i}'_{k_s}$ within the outer loop nest which corresponds to "for $\underline{i}'_K \in Q$", i.e., the loop nest generated according to the iteration space Q, which outer loop has stride σ' such that $\sigma' \cdot d_s = \sigma$ for some integer $d_s$, then the loop $\underline{i}'_{k_s}$ is permuted to become innermost and is fused with the innermost loop obtained after the first step.

This will be explained more thoroughly in the following.

If one has a general loop nest of depth n with indices, i.e., loop variables, $i_1$ to $i_n$, where $i_1$ is the loop variable of the outermost loop, $i_2$ is the loop variable of the second-outermost loop and so on, and increments normalized to 1 which could be written in pseudo C-like language as for($i_1 = i_1^{min}$; $i_1 \leq i_1^{max}$; $i_1$++) . . .
   for($i_n = i_n^{min}$; $i_1 \leq i_n^{max}$; $i_n$++)

where $i_1^{min}$ and $i_1^{max}$ are the minimal and maximal variables of the lth loop variable, respectively, and one has, as above, an array reference of the form A[H<u>i</u>] where $\underline{i} = (i_1, \ldots, i_n)^T$, incrementing the kth loop of the loop nest, i.e., the loop corresponding to the loop variable $i_k$, leads to a vector increment of the vector $\underline{i}$ of $\underline{e}^k$ in the iteration space, i.e., $\underline{i}$ becomes $\underline{i} + \underline{e}^k$.

This in turn leads to an inrement in the index space of the array A, since H <u>i</u> becomes H <u>i</u>+H $\underline{e}^k$.

The increment of the vector H <u>i</u> in the index space of the array A is denoted by h, i.e., $H\underline{e}^k =: \underline{h} = (h_1, \ldots, h_m)^T$.

This means an address increment between adr(A[H <u>i</u>]) and adr(A[H <u>i</u>+$\underline{e}^k$]), where adr(x) means the memory address of x.

This address increment is $B_1 \cdot h_1 + \ldots + B_m \cdot h_m$ according to equation (1), assuming, as above, a row wise memory layout of the matrix A.

The given expression for the address increment defines the stride of the reference of the array A connected with the kth loop.

It should be noted that in this context the expression "stride" is, strictly speaking, not correct, since "stride" usually refers to a constant memory offset.

Let now $\sigma$ be the stride connected with the innermost loop of the loop nest which resulted from the first step described above.

Since in this case a unimodular stride minimizing transformation was applied to the inner loop nest of (TLN2) alone, which is given by for $i'_J \in \text{conv.hull}(\cup_{i'_K \in Q} CPI_{i'_K})$ (see above), there may exist an outer loop with index $i'_{k_s}$, $k_s \in K$, giving rise to a stride $\sigma' < \sigma$.

In this case, a loop transformation is applied to make the loop with the index $i'_{k_s}$ innermost.

In case the new innermost loop is executed a constant number $d_n$ of times (this means constant loop boundaries) and in case $d_n \cdot \sigma' = \sigma$, the new innermost loop and the previous innermost loop, i.e. the loop which was innermost before the loop transformation which is second innermost now, can be fused to give a single loop of stride $\sigma'$.

This will result in a new loop nest of depth $n-1$.

Every $d_s$ elements subsequently accessed in its innermost loop are sent to the same parallel processing element and the address function according to equation (38) is updated accordingly.

The new "minimal stride" of this nest is $\sigma'$.

After the determination of the optimal transfer order for the transfer loop nest and after the necessary transformations have been performed, the process is finished with step 612.

In the following, a preferred choice of the transformation matrix $\underline{T} = (\underline{e}^{j_1}, \ldots, \underline{e}^{j_r}, \underline{x}^1, \ldots, \underline{x}^{n-r}) \in Z^{n,n}$, which is determined in step 607, is explained.

Any transformation matrix $\underline{T}$ is suitable, provided that its last $n-r$ columns form an integral basis of the space $\ker(\underline{H})$, and its first $r$ columns are chosen from the set of canonical unit vectors such that $\underline{T}$ is non-singular.

Preferably, $\underline{T}$ is chosen such that the bounding box defined by $b_k \in Z_+$, $k=1, \ldots, r$ and $c_k \in Z_+$, $k=1, \ldots, n-r$ from above has minimal volume.

In the following, a strategy for the minimization of $|\det \underline{T}| \cdot b_1 \cdot \ldots \cdot b_r$ is given.

This term is an upper bound for the volume of the bounding box under consideration.

As a consequence of Corollary 5.3c from Alexander Schrijver (cited above), p. 58, for any set of integral vectors $\tilde{\underline{x}}^1, \ldots, \tilde{\underline{x}}^{n-r}$ forming a basis of $\ker(\underline{H})$, there exists an integral, non-singular matrix $\underline{K} \in Z^{n-r,n-r}$ such that $(\tilde{\underline{x}}^1, \ldots, \tilde{\underline{x}}^{n-r}) = (\underline{x}^1, \ldots, \underline{x}^{n-r}) \cdot \underline{K}$. Thus, for every fixed set $J = \{j_1, \ldots, j_r\}$ as defined above, and for the identity matrix $\underline{I}_r \in Z^{r,r}$, the equation $$(\underline{e}^{j_1}, \ldots, \underline{e}^{j_r}, \tilde{\underline{x}}^1, \ldots, \tilde{\underline{x}}^{n-r}) = \qquad (42)$$

$$(\underline{e}^{j_1}, \ldots, \underline{e}^{j_r}, \underline{x}^1, \ldots, \underline{x}^{n-r}) \cdot \begin{pmatrix} I_r & 0 \\ 0 & K \end{pmatrix}$$

for a suitable matrix $\underline{K}$.

This means that the above choice of $\underline{x}^1, \ldots, \underline{x}^{n-r}$ from equation (26) actually minimizes $|\det \underline{T}|$.

This also means that a choice $J = \{j_1, \ldots, j_r\}$ which is valid for one basis $\underline{x}^1, \ldots, \underline{x}^{n-r}$ of $\ker \underline{H}$ is also valid for any other basis $\tilde{\underline{x}}^1, \ldots, \tilde{\underline{x}}^{n-r}$, wherein valid means that $(\underline{e}^{j_1}, \ldots, \underline{e}^{j_r}, \underline{x}^1, \ldots, \underline{x}^{n-r})$ and $(\underline{e}^{j_1}, \ldots, \underline{e}^{j_r}, \tilde{\underline{x}}^1, \ldots, \tilde{\underline{x}}^{n-r})$ respectively are not singular for this J.

Next, the statement that $b_1 \cdot \ldots \cdot b_r$ does not depend on the choice of the basis $\underline{x}^1, \ldots, \underline{x}^{n-r}$ of $\ker \underline{H}$ is shown.

To see this, let $\{\underline{x}^1, \ldots, \underline{x}^{n-r}\}$ and $\{\tilde{\underline{x}}^1, \ldots, \tilde{\underline{x}}^{n-r}\}$ be two candidate sets for a basis and let J be valid index set $J = \{j_1, \ldots, j_r\}$.

Let $\underline{T} = (\underline{e}^{j_1}, \ldots, \underline{e}^{j_r}, \underline{x}^1, \ldots, \underline{x}^{n-r})$ and $\tilde{\underline{T}} = (\underline{e}^{j_1}, \ldots, \underline{e}^{j_r}, \tilde{\underline{x}}^1, \ldots, \tilde{\underline{x}}^{n-r})$.

The term $b_1, \ldots, b_r$ is determined by the first $r$ dimensions of the bounding box of $\underline{T}^{-1} I$, which in turn is determined by the $r$ sums of absolute values from the elements of the first $r$ rows of $\underline{T}^{-1}$.

The above statement follows if it can be shown that all elements of the first $r$ rows of $\underline{T}^{-1}$ have the same absolute value as the corresponding elements from $\tilde{\underline{T}}^{-1}$.

To proof this, the fact is used that the element $(\underline{M}^{-1})_{i,j}$ in the $i$th row and $j$th column of the inverse $\underline{M}^{-1}$ of some matrix $\underline{M}$ is given by the term $\det(\underline{M}_{ji})/\det \underline{M}$ where $\underline{M}_{ji}$ is derived from $\underline{M}$ by replacing the $i$th column of $\underline{M}$ by the unit vector $\underline{e}^j$.

This means that the equation $$(\underline{T}^{-1})_{i,j} = \det(\underline{e}^{j_1}, \ldots, \underline{e}^{j_{i-1}}, \underline{e}^j, \underline{e}^{j_{i+1}}, \ldots, \underline{e}^{j_r}, \underline{x}^1, \ldots, \underline{x}^{n-r}) \qquad (43)$$

holds.

Further, there are factors $\lambda_1^{(1)}, \ldots, \lambda_{n-r}^{(1)}$ such that $$\tilde{\underline{x}}_1 = \sum_{k=1}^{n-r} \lambda_k^{(1)} \underline{x}^k,$$

as already seen above.

Without loss of generality, it is assumed that $\lambda_1^{(1)} \neq 0$, otherwise the order of $\underline{x}_1, \ldots, \underline{x}^{n-r}$ is changed which only changes the sign of the determinant.

Thus, the equation $$|\det(\underline{e}^{j_1}, \ldots, \underline{e}^{j_{i-1}}, \underline{e}^j, \underline{e}^{j_{i+1}}, \ldots, \underline{e}^{j_r}, \underline{x}^1, \ldots, \underline{x}^{n-r})| = |\det(\underline{e}^{j_1}, \ldots, \underline{e}^{j_{i-1}}, \underline{e}^j, \underline{e}^{j_{i+1}}, \ldots, \underline{e}^{j_r}, \tilde{\underline{x}}^1, \underline{x}^2, \ldots, \underline{x}^{n-r})| / |\lambda_1^{(1)}| \qquad (44)$$

follows by determinant rules.

The vectors form the set $\{\tilde{\underline{x}}^1, \underline{x}^2, \ldots, \underline{x}^{n-r}\}$ form also a basis for $\ker(\underline{H})$ and there are factors $\lambda_1^{(2)}, \ldots \lambda_{n-r}^{(2)}$ such that $$\tilde{\underline{x}}_2 = \lambda_1^{(2)} \tilde{\underline{x}}^1 + \sum_{k=1}^{n-r} \lambda_k^{(2)} \underline{x}^k \qquad (45)$$

holds.

Not all $\lambda_k^{(2)}$, $k \leq 2$, can be equal 0, and, by an eventual reordering of $\underline{x}^2, \ldots, \underline{x}^{n-r}$ it can be assumed that $\lambda_2^{(2)} \neq 0$. Therefore, $$|\det(\underline{e}^{j_1}, \ldots, \underline{e}^{j_{i-1}}, \underline{e}^j, \underline{e}^{j_{i+1}}, \ldots, \underline{e}^{j_r}, \tilde{\underline{x}}^1, \underline{x}^2, \ldots, \underline{x}^{n-r})| = |\det(\underline{e}^{j_1}, \ldots, \underline{e}^{j_{i-1}}, \underline{e}^j, \underline{e}^{j_{i+1}}, \ldots, \underline{e}^{j_r}, \tilde{\underline{x}}^1, \tilde{\underline{x}}^2, \underline{x}^3, \ldots, \underline{x}^{n-r})| / |\lambda_2^{(2)}| \qquad (46)$$

Be repeating the above arguments, the equation $$|\det(\underline{e}^{j_1}, \ldots, \underline{e}^{j_{i-1}}, \underline{e}^j, \underline{e}^{j_{i+1}}, \ldots, \underline{e}^{j_r}, \underline{x}^1, \ldots, \underline{x}^{n-r})| = |\det(\underline{e}^{j_1}, \ldots, \underline{e}^{j_{i-1}}, \underline{e}^j, \underline{e}^{j_{i+1}}, \ldots, \underline{e}^{j_r}, \tilde{\underline{x}}^1, \ldots, \tilde{\underline{x}}^{n-r})| / |\lambda_1^{(1)} \cdot \ldots \cdot \lambda_{n-r}^{(n-r)}| \qquad (47)$$

can be proven, and since, by the same procedure, one has $$|\det(\underline{T})| = |\det(\tilde{\underline{T}})| / |\lambda_1^{(1)} \cdot \ldots \cdot \lambda_{n-r}^{(n-r)}| \qquad (48)$$

it can be concluded that $$|(\mathcal{I}^{-1})_{i,j}|=|(\tilde{\mathcal{I}}^{-1})_{i,j}|, \ i=1,\ldots,r; j=1,\ldots,n \tag{49}$$

as it was stated.

Finally, the set $J=\{j_1, \ldots, j_r\}$ is chosen in an optimal way.

Since there is only a limited number of choices (in practice it can be assumed that $n \leq 5$) it is a simple matter of trying out to choose $J=\{j_1, \ldots, j_r\}$ such that $|\det \mathcal{I}| \cdot b_1 \cdot \ldots \cdot b_r$ is minimal.

If there is no unique optimal solution, J is chosen such that $j_r$ becomes minimal.

Since in the above method it can be interpreted that $j_1, \ldots, j_r$ are the dimensions of I to be projected "out", this means that a maximal sub-block of I is mapped identically to itself via f.

Illustratively speaking, this means that a maximal number of inner loops from the processing loop nest will find its data at the parallel processing elements they were originally allocated to.

The invention claimed is:

1. A computer system for electronic data processing comprising:
    a first memory in which data are stored in a form of a multi-dimensional array;
    a second memory connected to the first memory;
    a processing unit for operating on the second memory;
    at least one independently programmable data transfer unit for controlling data transfer between the first memory and the second memory, wherein the data transfer unit controls the data transfer according to a strategy such that, when an affine-indexed array segment of the multi-dimensional array is transferred and when this array segment is referenced in a loop nest, locality for the transfer is established.

2. The computer system according to claim 1, wherein the data transfer unit controls the data transfer according to a strategy such that, when an affine-indexed array segment of the multi-dimensional array is transferred and when this array segment is referenced in a loop nest, spatial and or temporal locality for the transfer is established.

3. The computer system according to claim 1, wherein the computer system has a parallel computer architecture and comprises a plurality of parallel processing elements, the first memory is a shared memory, the second memory is a local memory, and the processing unit is one of the plurality of parallel processing elements.

4. The computer system according to claim 3, wherein the parallel computer architecture is a SIMD architecture.

5. The computer system according to claim 1, wherein the data transfer occurs in blocks of bytes which are contiguous in the first memory.

6. The computer system according to claim 1, wherein the at least one independently programmable data transfer unit comprises a first independently programmable data transfer unit controlling the data transfer from the first memory to the second memory and a second independently programmable data transfer unit controlling the data transfer from the second memory to the first memory.

7. A method for transferring an affine-indexed array segment of a multi-dimensional array referenced in a loop nest from a first memory to a second memory, comprising the steps of:
    controlling the data transfer using at least one independently programmable data transfer unit; and
    executing a transfer loop nest on the at least one independently programmable data transfer unit, wherein the transfer loop nest is a copy of the loop nest in which the array segment is referenced, with a body of the loop being replaced by only a data access function for the multi-dimensional array under consideration and to which copy a loop transformation has been applied,
    wherein the applied loop transformation is such that locality for the data transfer is established.

8. The method according to claim 7, wherein multiple array references are summarized into single transfer objects, whenever possible, such that multiple transfers of same data elements are avoided.

9. The method according to claim 7, wherein the applied loop transformation is such that optimized stride is achieved in an innermost loop of the transfer loop nest.

10. The method according to claim 9, further comprising the step of computing a unimodular matrix such that a product of the unimodular matrix and an index matrix is in lower triangular echelon form and the applied transformation corresponds to a multiplication of an original iteration space with an inverse of the unimodular matrix.

11. The method according to claim 10, wherein, when the index matrix is singular, a projected iteration space is calculated such that temporal locality for the data transfer is established.

12. The method according to claim 9, further comprising the step of computing a unimodular matrix such that its last column represents an iteration space vector achieving minimal stride, which is computed as a solution of a linear integer program, and the applied transformation corresponds to a multiplication of an original iteration space with an inverse of the unimodular matrix.

13. The method according to claim 9, further comprising the step of selecting one matrix of a first unimodular matrix, second unimodular matrix, and competing third unimodular matrix, wherein a product of the first unimodular matrix and an index matrix is in lower triangular echelon form, the last column of the second unimodular matrix represents an iteration space vector achieving minimal stride, and the competing third unimodular matrix is a product of loop permutations and loop reversals and allows fusion of loops from the transformed iteration space, and
    wherein the selection depends on which of the matrices leads to optimized spatial locality for the data transfer in terms of an optimal ratio between transferred and used data when the matrix is used as a transformation matrix for the loop transformation.

* * * * *

UNITED STATES PATENT AND TRADEMARK OFFICE
CERTIFICATE OF CORRECTION

PATENT NO. : 7,254,679 B2
APPLICATION NO. : 10/911224
DATED : August 7, 2007
INVENTOR(S) : Mathias Richter et al.

It is certified that error appears in the above-identified patent and that said Letters Patent is hereby corrected as shown below:

In the Specification:

At column 3: line 13: "Implementtion" should read --Implementation--
line 40: "globally" should read --global--
line 67: "multiply" should read --multiple--

At column 4: line 62: "that is, it can" should read --that can be--

At column 8: line 20: "program" should read --programs--

At column 10: line 10: "preferable" should read --preferably--
line 59-60: "to to zero" should read --to zero-- (no new paragraph)

At column 14: line 30: "(b·(b·" should read --(b·--

At column 15: line 26: "a independently" should read --an independently--

At column 18: line 5: "mod p" should read --mod β--

At column 20: line 10: "a independently" should read --an independently--
line 58: "an preferred" should read --a preferred--

At column 23: line 35: "α:$I$" should read --π:$I$--

At column 26: line 55: "inrement" should read --increment--

UNITED STATES PATENT AND TRADEMARK OFFICE
CERTIFICATE OF CORRECTION

PATENT NO. : 7,254,679 B2
APPLICATION NO. : 10/911224
DATED : August 7, 2007
INVENTOR(S) : Mathias Richter et al.

It is certified that error appears in the above-identified patent and that said Letters Patent is hereby corrected as shown below:

At column 28:  line 54:   "$k\leqq$" should read --$k\geq$--
                line 57:   "$\underline{e}^{jis\ 1}$" should read --$\underline{e}^{j1}$--
                line 60:   "Be" should read --By--

Signed and Sealed this

Thirtieth Day of October, 2007

JON W. DUDAS
*Director of the United States Patent and Trademark Office*